United States Patent
Harada et al.

(10) Patent No.: US 11,139,881 B2
(45) Date of Patent: Oct. 5, 2021

(54) USER TERMINAL AND RADIO COMMUNICATION METHOD

(71) Applicant: NTT DOCOMO, INC., Tokyo (JP)

(72) Inventors: Hiroki Harada, Tokyo (JP); Satoshi Nagata, Tokyo (JP); Jing Wang, Beijing (CN); Liu Liu, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/494,929

(22) PCT Filed: Mar. 23, 2017

(86) PCT No.: PCT/JP2017/011898
§ 371 (c)(1),
(2) Date: Sep. 17, 2019

(87) PCT Pub. No.: WO2018/173239
PCT Pub. Date: Sep. 27, 2018

(65) Prior Publication Data
US 2020/0099437 A1    Mar. 26, 2020

(51) Int. Cl.
*H04B 7/06*   (2006.01)
*H04W 74/08*   (2009.01)
*H04B 17/318*   (2015.01)
*H04W 72/04*   (2009.01)
*H04L 5/00*   (2006.01)

(52) U.S. Cl.
CPC ......... *H04B 7/0695* (2013.01); *H04B 17/318* (2015.01); *H04L 5/0048* (2013.01); *H04W 72/042* (2013.01); *H04W 72/046* (2013.01); *H04W 74/0833* (2013.01)

(58) Field of Classification Search
CPC .... H04B 7/0617; H04B 7/0695; H04B 17/17; H04B 17/318; H04B 17/327; H04L 5/0023; H04L 5/0048; H04L 5/0053; H04W 72/042; H04W 72/046; H04W 72/085; H04W 74/0833; H04W 76/15; H04W 76/19
See application file for complete search history.

(56) References Cited

U.S. PATENT DOCUMENTS

| | | | |
|---|---|---|---|
| 2012/0243516 A1* | 9/2012 | Ishii | H04L 5/0053 370/336 |
| 2018/0227887 A1* | 8/2018 | Hakola | H04B 7/022 |
| 2018/0278467 A1* | 9/2018 | John Wilson | H04W 72/046 |

OTHER PUBLICATIONS

International Search Report issued in PCT/JP2017/011898 dated Jun. 20, 2017 (1 page).

(Continued)

*Primary Examiner* — Khoa Huynh
(74) *Attorney, Agent, or Firm* — Osha Bergman Watanabe & Burton LLP

(57) ABSTRACT

Beam failure detection and/or beam recovery are performed properly. A user terminal according to the present invention has a receiving section that receives a downlink (DL) control channel, and a control section that configures at least part of one or more beams configured for monitoring a beam failure, for monitoring the DL control channel, and the control section configures at least part of one or more beams configured for channel state information (CSI) measurement and/or reporting, for receiving a downlink (DL) data channel.

6 Claims, 21 Drawing Sheets

(56) References Cited

OTHER PUBLICATIONS

Written Opinion of the International Searching Authority issued in PCT/JP2017/011898 dated Jun. 20, 2017 (3 pages).
ETSI TS 136 300 V8.12.0; "LTE; Evolved Universal Terrestrial Radio Access (E-UTRA) and Evolved Universal Terrestrial Radio Access Network (E-UTRAN); Overall description; Stage 2 (3GPP TS 36.300 version 8.12.0 Release 8)"; Apr. 2010; (153 pages).
Extended European Search Report in counterpart European Application No. 17901400.6 dated Aug. 17, 2020 (11 pages).
K. Takeda; "Status Report to TSG 1 Work plan related evaluation"; 3GPP TSG RAN Meeting #75, RP-170376; Dubrovnik, Croatia; Mar. 6-9, 2017 (157 pages).
Office Action issued in the counterpart Japanese Patent Application No. 2019-506872, dated May 25, 2021 (6 pages).
Vivo; "Discussion on beam recovery"; 3GPP TSG RAN WG1 Meeting #88, R1-1703389; Athens, Greece, Feb. 13-17, 2017 (4 pages).

\* cited by examiner

TX BEAM B21 → CSI RESOURCE #1
TX BEAM B22 → CSI RESOURCE #2...SECOND BEST TX BEAM
TX BEAM B23 → CSI RESOURCE #3...BEST TX BEAM
TX BEAM B24 → CSI RESOURCE #4

TX BEAM B23 (RX BEAM b3) ← CSI RESOURCE #3 ← DMRS PORT #0
TX BEAM B22 (RX BEAM b2) ← CSI RESOURCE #2 ← DMRS PORT #1

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of LTE (Long Term Evolution) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," or "LTE Rel. 12") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "NR (New Radio)," "NX (New radio access)," "FX (Future generation radio access)," "LTE Rel. 13," "LTE Rel. 14," "LTE Rel. 15" or later versions) are under study.

In LTE Rel. 10/11, CA (Carrier Aggregation) to integrate multiple CCs (Component Carriers) is introduced in order to achieve broadbandization. Every CC is formed using the system bandwidth of LTE Rel. 8 as 1 unit. In addition, in CA, multiple CCs under the same radio base station (also referred to as "eNB (eNodeB)") are configured in a user terminal (also referred to as "UE (User Equipment)").

Meanwhile, in LTE Rel. 12, DC (Dual Connectivity), in which multiple CGs (Cell Groups), formed by different radio base stations, are configured in UE, is also introduced. Every cell group is comprised of at least 1 cell (or CC). Given that multiple CCs of different radio base stations are aggregated in DC, DC is also referred to as "inter-base station CA (inter-eNB CA)" and the like.

In existing LTE systems (for example, LTE Rel. 8 to 13), a user terminal receives downlink control information (DCI) via a downlink (DL) control channel (for example, PDCCH (Physical Downlink Control CHannel), EPDCCH (Enhanced Physical Downlink Control CHannel), MPDCCH (Machine-type communication (MTC) Physical Downlink Control CHannel), etc.). Based on this DCI, the user terminal receives DL data channels (for example, PDSCH (Physical Downlink Shared CHannel)) and/or transmits UL data channels (for example, PUSCH (Physical Uplink Shared CHannel)).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Envisaging future radio communication systems (for example, 5G, NR, etc.), research is underway to use higher frequency bands (for example, 3 to 40 GHz) than existing frequency bands, in order to achieve high speeds and large capacity (for example, as in enhanced mobile broad band (eMBB). In general, higher frequency bands suffer greater distance-induced attenuation, and this makes it difficult to ensure coverage. Therefore, studies on MIMO (also referred to as "multiple input multiple output," "massive MIMO," and so on), which uses a large number of antenna elements, are underway.

In MIMO, which uses a large number of antenna elements, it is possible to form beams (antenna directivities) by controlling the amplitude and/or the phase of signals transmitted or received via each antenna element (this is referred to as "beamforming (BF)"). For example, when antenna elements are arranged two-dimensionally, the higher the frequency, the greater the number of antenna elements that can be arranged in a predetermined area. When the number of antenna elements in a given area increases, the beam width narrows (becomes narrower), so that the beamforming gain increases. Therefore, when beamforming is used, propagation loss (path loss) can be reduced, and coverage can be ensured even in high frequency bands.

Meanwhile, when beamforming is used (for example, when narrower beams are anticipated to be used in higher frequency bands), the quality of beams (also referred to as, for example, "BPLs (Beam Pair Links)" and the like) might deteriorate due to blockage caused by obstacles and/or suchlike factors, and, as a result of this, an RLF (Radio Link Failure) might occur frequently. When an RLF occurs, cell connections need to be re-established, so that, if an RLF occurs frequently, there may be a decline in system performance.

Therefore, to prevent RLFs from occurring, it is preferable to take appropriate measures, such as detecting beam failures (BFs), in which the quality of specific beams deteriorates, switching to other beams of better quality (which is also referred to as "L1/L2 beam recovery") and so forth.

The present invention has been made in view of the above, and it is therefore an object of the present invention to provide a user terminal and a radio communication method, whereby beam failures can be detected and/or beams can be recovered properly.

Solution to Problem

According to one aspect of the present invention, a user terminal has a receiving section that receives a downlink (DL) control channel, and a control section that configures at least part of one or more beams configured for monitoring a beam failure, for monitoring the DL control channel, and the control section configures at least part of one or more beams configured for channel state information (CSI) measurement and/or reporting, for receiving a downlink (DL) data channel.

Advantageous Effects of Invention

According to the present invention, beam failures can be detected and/or beams can be recovered properly.

DESCRIPTION OF EMBODIMENTS

Future radio communication systems (for example, 5G, NR, etc.) presume use cases characterized by, for example, high speed and large capacity (for example, eMBB), a very large number of terminals (for example, massive MTC (Machine-Type Communication)), ultra-high reliability and low latency (for example, URLLC (Ultra-Reliable and Low-Latency Communications), and so on. Assuming these use cases, for example, studies are in progress to communicate by using beamforming (BF) in future radio communication systems.

Beamforming (BF) includes digital BF and analog BF. Digital BF refers to the method of performing precoding signal processing on the baseband (for digital signals). In this case, inverse fast Fourier transform (IFFT)/digital-to-analog conversion (DAC)/RF (Radio Frequency) need to be carried out in parallel processes, as many as the number of antenna ports (RF Chains). Meanwhile, it is possible to form a number of beams to match the number of RF chains, at any given timing.

Analog BF refers to the method of using phase shifting devices on RF. In this case, since it is only necessary to rotate the phase of RF signals, analog BF can be implemented with simple and inexpensive configurations, but it is still not possible to form a plurality of beams at the same time. To be more specific, when analog BF is used, each phase shifting device can only form 1 beam at a time.

Thus, if a radio base station (referred to as, for example, a "gNB (gNodeB)," a "transmission and reception point (TRP)," an "eNB (eNode B)," a "base station (BS)" and so on) has only 1 phase shifter, the radio base station can only form 1 beam at any given time. Therefore, when multiple beams are transmitted using analog BF alone, these beams cannot be transmitted simultaneously using the same resource, and the beams need to be switched, rotated and so on, over time.

Note that it is also possible to adopt a hybrid BF design that combines digital BF and analog BF. Although, for future radio communication systems (for example, 5G, NR, etc.), studies are under way to introduce MIMO (for example, massive MIMO), which uses a large number of antenna elements, attempting to form an enormous number of beams using digital BF alone might lead to expensive circuit structures. For this reason, there is a possibility that hybrid BF will be used in future radio communication systems.

When BF (including digital BF, analog BF, hybrid BF and so forth) is used as described above, the quality of beams (also referred to as, for example, "BPLs (Beam Pair Links)") might deteriorate due to blockage caused by obstacles and/or suchlike factors, and, as a result of this, an RLF (Radio Link Failure) might occur frequently. When an RLF occurs, cell connections need to be re-established, so that, if an RLF occurs frequently, this may lead to a degradation of system performance. Therefore, there is a plan to introduce beam management in order to ensure the robustness of BPLs.

Figure 1A:
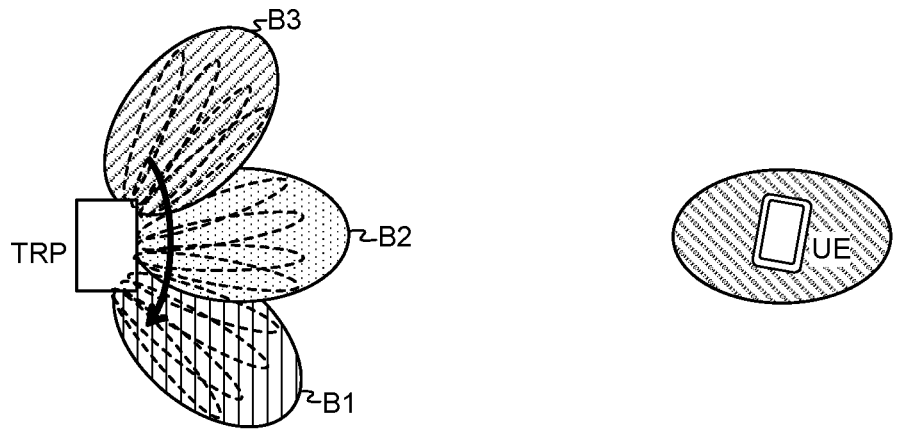
FIGS. 1A, 1B, and 1C are conceptual diagrams to show examples of beam management.

FIG. 1 provide diagrams to show examples of beam management. FIG. 1A shows the management of beams for use for signals (mobility measurement signals) for use for mobility measurements (also referred to as "RRM (Radio Resource Management) measurements," "L3 (Layer 3) measurements," "L3-RSRP (Layer 3-Reference Signal Received Power) measurements," "L3 mobility measurements," and so on). Beams that are used for mobility measurement signals may be rough beams that have relatively wide beam widths. Also, since one or more beams having relatively narrow beam widths (also referred to as "finer beams," "narrower beams," and/or the like) can be arranged inside a rough beam, a rough beam may be referred to as a "beam group."

Here, mobility measurement signals may be also referred to as "SS (Synchronization Signal) blocks," "MRSs (Mobility Reference Signals)," "CSI-RSs (Channel State Information Reference Signals)," "beam-specific signals," "cell-specific signals," and so on. An SS block refers to a signal group that includes at least one of a PSS (Primary Synchronization Signal), an SSS (Secondary Synchronization Signal) and a broadcast channel (for example, a PBCH (Physical Broadcast CHannel)). In this way, a mobility measurement signal may be at least one of the PSS, the SSS, the PBCH, the MRS and the CSI-RS, or may be a signal that is formed by enhancing and/or modifying at least one of the PSS, the SSS, the PBCH, the MRS and the CSI-RS (for example, a signal that is formed by changing the density and/or the cycle of at least one of these signals).

Note that, referring to FIG. 1A, a user terminal may be either in RRC-connected mode or in idle mode, and the user terminal has only to be in a mode in which the user terminal can identify the configurations of mobility measurement signals. Also, the user terminal does not have to form Rx beams (receiving beams).

In FIG. 1A, a radio base station (also referred to as a "TRP") transmits mobility measurement signals (for example, SS blocks and/or CSI-RSs) that are associated with beams B1 to B3. In FIG. 1A, analog BF is used, so that the mobility measurement signals associated with beams B1 to B3 are all transmitted at different times (for example, in different symbols, slots and so on) (this is also referred to as "beam sweeping"). Note that, when digital BF is used, mobility measurement signals associated with beams B1 to B3 may be transmitted at the same time.

The user terminal (UE) conducts L3 measurements using the mobility measurement signals associated with beams B1 to B3. Note that, in L3 measurements, the received power (for example, at least one of RSRP and RSSI (Reference Signal Strength Indicator)) and/or the received quality (for example, at least one of RSRQ (Reference Signal Received Quality), SNR (Signal-Noise Ratio) and SINR (Signal-to-Interference plus Noise Power Ratio) of mobility measurement signals has to be measured.

The user terminal transmits a measurement report (MR) that contains the identifiers of one or more beams (also referred to as "beam IDs," "beam indices (BIs)" and so on) and/or the measurement results of these beams, by using higher layer signaling (for example, RRC signaling). Note that the mobility measurement signals' resources, antenna ports and so on may be reported, instead of beam IDs. For example, in FIG. 1A, the user terminal transmits a measurement report including the BI and/or the RSRP of beam B2, which shows the best RSRP.

Also, the radio base station may select (group) beams (beam group) for the user terminal based on the measurement report (MR). For example, in FIG. 1A, the user terminal and the radio base station may classify beam B2 as an active beam and beams B1 and B3 as inactive beams (backup beams). Here, an active beam may refer to a beam that can be used for a DL control channel (hereinafter also referred to as "NR-PDCCH," "PDCCH," etc.) and/or a DL data channel (hereinafter also referred to as "PDSCH"), and an inactive beam may refer to a beam (prospective beam) that is not an active beam. A set of one or more active beams may be referred to as an "active beam set" and so on, and a set of one or more inactive beams may be referred to as an "inactive beam set" and so on. Note that the user terminal may select (group) beams based on L3 measurement results and report the result of selection to the radio base station.

Figure 1B:
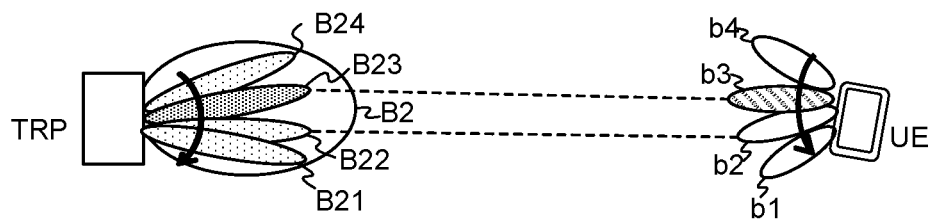

FIG. 1B shows L1 (physical layer) beam managements (also referred to as "beam measurements," "L1 (Layer 1) measurements," "CSI (Channel State Information) measurements," "L1-RSRP measurements" and so forth). The signals for beam measurements (beam measurement signals) may be at least one of the CSI-RS, the SS block, the PSS, the SSS, the PBCH and the MRS, or may be signals that are formed by enhancing and/or modifying at least one of these signals (for example, signals that are formed by changing the density and/or the cycle of at least one of these signals).

For example, in L1 beam management, beams (also referred to as "Tx beams," "transmitting beams," and/or the like) for use for transmitting the NR-PDCCH and/or the PDSCH (hereinafter also referred to as "NR-PDCCH/PDSCH") and/or beams (also referred to as "Rx beams," "receiving beams," and/or the like) for use for receiving these NR-PDCCH/PDSCH are managed.

In FIG. 1B, the radio base station (TRP) transmits configuration information pertaining to K (here, K=4) CSI-RS resources #1 to #4, which are associated with K Tx beams B21 to B24, to the user terminal.

A CSI-RS resource is, for example, at least one of an NZP (Non-Zero-Power) CSI-RS resource and a ZP (Zero-Power) CSI-RS resource for IM (Interference Measurements). The user terminal measures CSI for each CSI process where one or more CSI-RS resources are configured. A CSI-RS resource can be replaced with a CSI-RS (including a NZP-CSI-RS, a ZP-CSI-RS, etc.) that is transmitted using this CSI-RS resource.

The user terminal (UE) measures CSI-RS resources #0 to #3 that are configured. To be more specific, the user terminal conducts L1 measurements (for example, CSI measurements and/or L1-RSRP measurements) for K (here, K=4) CSI-RS resources that are respectively associated with K Tx beams B21 to B24, and generates CSI and/or L1-RSRP based on the measurement results.

Here, the CSI may include at least one of a CQI (Channel Quality Indicator), a PMI (Precoding Matrix Indicator), an RI (Rank Indicator), and a CRI (CSI-RS Resource Indicator). As mentioned earlier, Tx beams are associated with CSI-RS resources, so that it is possible to say that a CRI specifies a Tx beam.

Based on the measurement results of K Tx beams (or K CSI-RS resources corresponding to these Tx beams), the user terminal selects N (K≤N) Tx beams. Here, the number of Tx beams, or "N," may be determined in advance, configured by higher layer signaling, or specified by physical layer signaling.

The user terminal may determine which Rx beam is suitable for each Tx beam that is selected, and select beam pair link (BPL). Here, a BPL refers to an optimal combination of a Tx beam and an Rx beam. For example, in FIG. 1B, the combination of Tx beam B23 and Rx beam b3 is selected as the best BPL, and the combination of Tx beam B22 and Rx beam b2 is selected as the second best BPL.

The user terminal transmits N CRIs, which correspond to the N Tx beams selected, and at least one of the CQIs, RIs and PMIs of the N Tx beams derived from the N CRIs, to the radio base station. Also, the user terminal may transmit the RSRPs of N Tx beams to the radio base station. Furthermore, the user terminal may transmit the IDs of Rx beams (also referred to as "Rx beam IDs," "BIs," "beam IDs" and/or the like) corresponding to the N Tx beams.

The radio base station selects the TX beam (or the BPL) to use for the NR-PDCCH and/or the PDSCH (NR-PDCCH/PDSCH), and indicates this Tx beam (or BPL) to the user terminal. To be more specific, the radio base station may select the Tx beam to use for the NR-PDCCH and/or the PDSCH (NR-PDCCH/PDSCH) based on N CSIs (for example, N CRIs, at least one of the CQIs, RIs and PMIs of the Tx beams as shown by these N CRIs, and so on) and/or L1-RSRPs from the user terminal. Also, the radio base station may select the BPL based on the Rx beam ID of the Rx beam corresponding to this Tx beam.

Beams may be indicated from the radio base station to the user terminal based on how the antenna ports (DMRS ports) of NR-PDCCH/PDSCH demodulation reference signals (DMRSs) and CSI-RS resources are associated (QCL (Quasi-Co-Location)). Note that the QCL between DMRS ports and CSI-RS resources may be indicated separately for the NR-PDCCH and for the PDSCH.

Figure 1C:
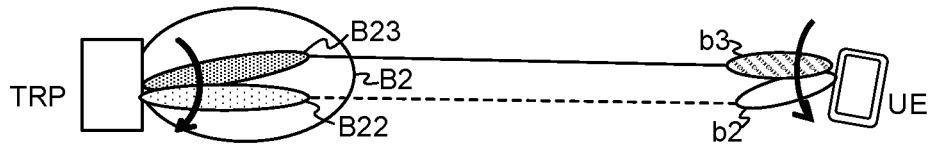

For example, in FIG. 1C, information to show the association between CSI-RS resource #2 of the best BPL (Tx beam B23 and Rx beam b3) in FIG. 1B and DMRS port #0, and the association between CSI-RS resource #1 of the second best BPL (Tx beam B23 and Rx beam b3) and DMRS port #1 is reported from the radio base station to the user terminal via higher layer signaling and/or physical layer signaling (for example, DCI).

In FIG. 1C, the user terminal demodulates the NR-PDCCH/PDSCH on the assumption that, in DMRS port #0, this NR-PDCCH is transmitted by using Tx beam B23, where the best measurement result of CSI-RS resource #2 has been derived. Furthermore the user terminal may demodulate the NR-PDCCH/PDSCH by using Rx beam b3, which corresponds to Tx beam B23.

The user terminal demodulates the NR-PDCCH/PDSCH on the assumption that, in DMRS port #1, the NR-PDCCH is transmitted by using Tx beam B22, where the best measurement result of CSI-RS resource #1 has been derived. Furthermore the user terminal may demodulate the NR-PDCCH/PDSCH by using Rx beam b2, which corresponds to Tx beam B22.

Under the above-described beam management is implemented, when the quality of a particular beam (or BPL) deteriorates, it is desirable to prevent a radio link failure (RLF) from occurring by properly detecting the beam failure caused by this beam and/or by properly carrying out the process of switching to another beam (beam recovery).

Now, beam failure detection and/or beam recovery may be initiated and performed by a radio base station, or may be initiated and performed by a user terminal. Given that a user terminal monitors DL signals (for, for example, at least one of CSI measurement, L1-RSRP measurement, NR-PDCCH monitoring (also referred to as "PDCCH monitoring," "blind decoding," etc.), PDSCH receipt, and so on), beam failure detection and/or beam recovery, when initiated by a user terminal, can be effectively speeded up. Therefore, the present inventors have studied how to allow a user terminal to initiate and perform beam failure detection and/or beam recovery properly, and arrived at the present invention.

Now, embodiments of the present invention will be described below in detail with reference to the accompanying drawings. Note that although the beamforming according to the herein-contained embodiments of the present invention presumes digital BF, analog BF and hybrid BF can be used as appropriate. Also, although BPLs will be primarily described in the following description, a "beam" according the present invention does not have to be a beam pair link (BPL) comprised of a Tx beam and an Rx beam, and may be a Tx beam or an Rx beam.

Figure 2:
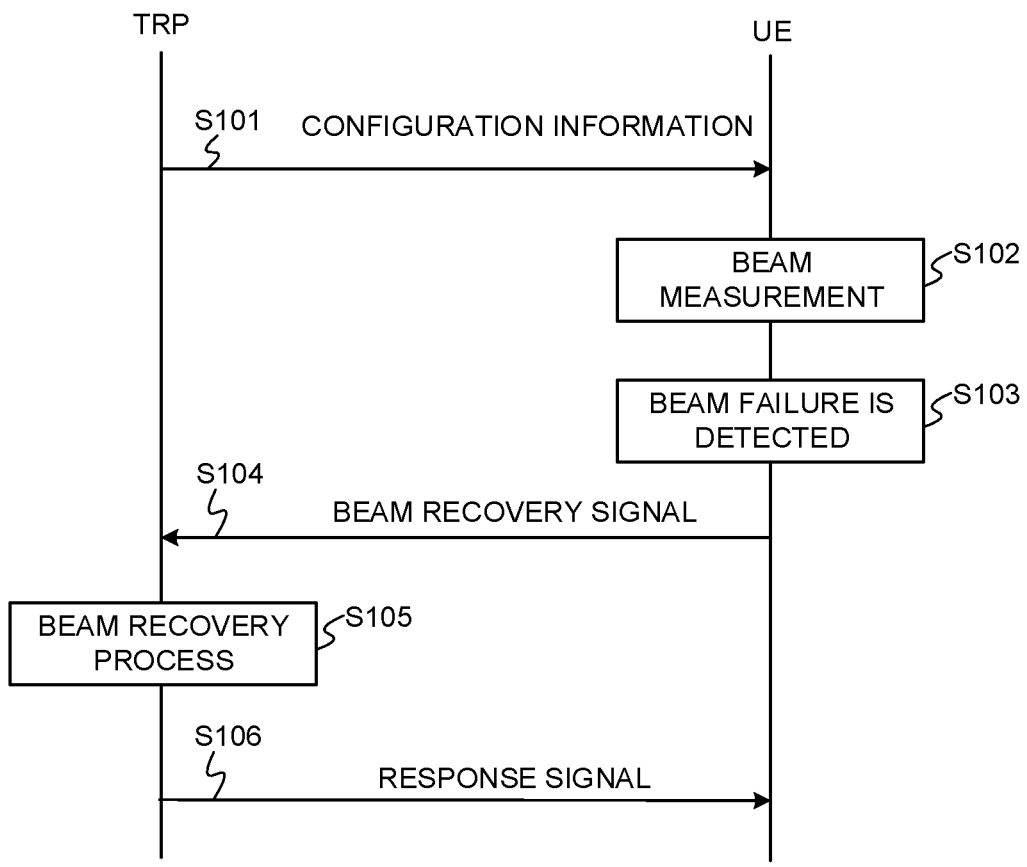
FIG. 2 is a diagram to show an example of user terminal-initiated beam failure detection and/or beam recovery operations.

FIG. 2 is a diagram to show an example of user terminal-initiated beam failure detection and/or beam recovery operations. As shown in FIG. 2, in step S101, a radio base station (TRP) transmits configuration information for beam measurements. This configuration information includes, for example, configuration information for at least one of CSI measurement, L1-RSRP measurement, PDCCH monitoring, PDSCH receipt and monitoring for detecting beam failures (BPL monitoring).

In step S102, a user terminal (UE) performs beam measurement (for example, the CSI measurement of FIG. 1B and/or L1-RSRP measurement). Also, the user terminal monitors the PDCCH and/or receives the PDSCH (see, for example, FIG. 1C).

In step S103, the user terminal (UE) detects a beam failure based on the result of monitoring for beam failure detection (BPL monitoring). To be more specific, the user terminal detects a beam failure based on the comparison result of the quality of a predetermined number BPLs of active beams with a certain threshold.

Figure 3:
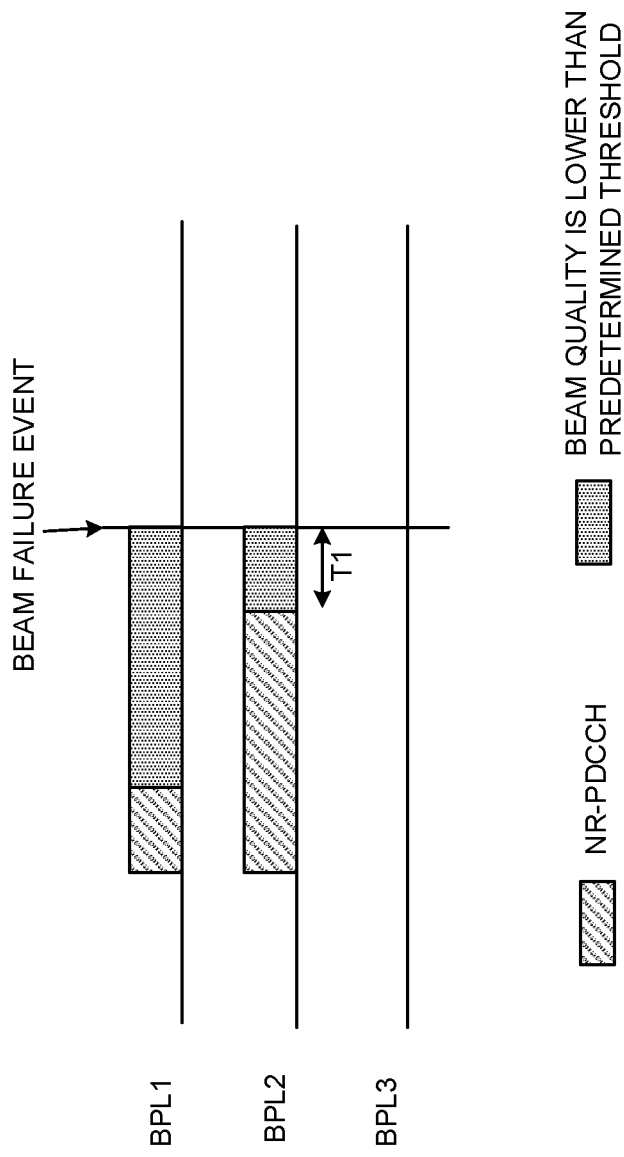
FIG. 3 is a diagram to show an example of beam failure detection.

FIG. 3 is a diagram to show an example of beam failure detection. For example, referring to FIG. 3, Y BPLs (Y=3 here) are configured in the user terminal for BPL monitoring, and a beam failure event occurs when the state in which the beam quality of X BPLs (X≤Y, and X=2 here) is lower than a certain threshold continues for or more than a predetermined period T1. Note that at least one of the Y BPLs may be associated with an N-PDCCH.

Furthermore, as for the signal for detecting beam failures (and/or candidate BPLs to switch to), for example, at least one of the mobility measurement signal, the CSI-RS, the time and/or frequency tracking reference signal, the SS block, the PDCCH DMRS and the PDSCH DMRS may be used. Note that the PDCCH DMRS here may be a PDCCH DMRS that is used in common by one or more user terminals in a group (UE group), and/or may be a PDCCH DMRS that is specific to a certain user terminal.

In step S104 of FIG. 2, the user terminal (UE) reports that a beam failure has been detected and/or transmits a UL signal for requesting beam recovery (also referred to as a "beam recovery signal"). In step S105, the radio base station performs the beam recovery process based on this beam recovery signal. In step S106, the radio base station transmits a response signal to the beam recovery signal.

In the event beam failure detection and/or beam recovery are initiated by a user terminal as described above, the problem lies in how to configure a set of one or more BPLs that is subject to BPL monitoring (and that is also referred to as "BPL set," "beam set," etc.). So, the first example will describe below the configuration of the BPL set that is subject to BPL monitoring.

Also, as described above with reference to step S103 of FIG. 2, when a user terminal detects a beam failure based on the result of comparing the quality of BPLs of active beams with a predetermined threshold, there is a danger that proper beam recovery is not possible. So, a second example will describe below the conditions for beam failure detection that allow proper beam recovery.

In addition, what UL signal should be used as the beam recovery signal in step S104 of FIG. 2 and/or how this signal should be transmitted are also problems. So, a third example will describe below what UL signal is used as the beam recovery signal and/or how this beam recovery signal is transmitted.

Also, what kind of beam recovery process the radio base station has to perform in step S105 of FIG. 2 and/or what response signal the radio base station has to transmit in step S106 are yet other problems. So a fourth example will describe below the beam recovery process and transmission of response signals in the radio base station in response to beam recovery signals from a user terminal.

First Example

Besides BPL monitoring, a user terminal may perform processes related to a predetermined number of BPLs, including, for example, at least one of PDCCH monitoring, PDSCH receipt, CSI measurement and/or reporting (CSI measurement/reporting), L1-RSRP measurement and/or reporting (L1-RSRP measurement/reporting) and so on.

For example, in PDCCH monitoring, the user terminal monitors (blind-decodes) a predetermined number of BPLs to detect a DL control channel (for example, PDCCH). Also, in PDSCH receipt, the user terminal receives a DL data channel (for example, PDSCH) by using one or more BPLs. Also, in CSI measurement/reporting, the user terminal measures and/or reports CSI with respect to one or more BPLs.

Also, in L1-RSRP measurement/reporting, the user terminal measures the RSRP of one or more BPLs (or Tx beams) by using a predetermined measurement signal (for example, CSI-RS and/or SS block), and reports the measured RSRP through L1 signaling (for example, PUSCH or PUCCH).

When configuring separate BPL sets for BPL monitoring, PDCCH monitoring, PDSCH receipt, CSI measurement/reporting and L1-RSRP measurement/reporting like this, there is a danger that these BPL sets cannot be configured efficiently.

So, with the first example, configuration of BPL sets is made efficient by making common at least the BPL set for BPL monitoring and the BPL sets for PDCCH monitoring. Now, how the BPL sets for BPL monitoring, PDCCH monitoring, PDSCH receipt, CSI measurement/reporting and L1-RSRP measurement/reporting are related to each other will be defined below.

To be more specific, the BPL sets for PDCCH monitoring is included in the BPL sets for BPL monitoring. By this means, beam failures can be detected by using BPLs associated with the PDCCH. Note that the BPL sets for PDCCH monitoring is preferably equal to the BPL sets for BPL monitoring, but both may not be equal as long as they are mutually inclusive.

Also, the BPL sets for PDSCH receipt may be included in the BPL sets for CSI measurement/reporting. By this means, the radio base station can acquire the CSI of the BPLs for use for transmitting the PDSCH. Note that the BPL sets for PDCCH receipt are preferably equal to the BPL sets for BPL monitoring, but both may not be equal as long as they are mutually inclusive.

Also, these BPL sets for CSI measurement/reporting may be included in the beam sets for L1-RSRP measurement/reporting. By this means, the radio base station can select the BPLs for CSI measurement/reporting, from among the BPLs, the RSRPs of which have been reported based on L1-RSRP measurement/reporting. Note that the BPL sets for PDCCH monitoring are preferably equal to the BPL sets for BPL monitoring, but both may not be equal as long as they are mutually inclusive.

Also, the BPL sets for PDSCH receipt may or may not be included in the BPL sets for PDCCH monitoring.

Now, cases (cases 1 to 6) will be described below in detail, in which the BPL sets for PDCCH monitoring are equal to the BPL sets for BPL monitoring, and in which the BPL sets for PDSCH receipt are equal to the BPL sets for CSI measurement/reporting. In cases 1 to 3, the BPL sets for CSI measurement/reporting and the BPL sets for L1-RSRP measurement/reporting are equal. In cases 4 to 6, the BPL sets for CSI measurement/reporting and the beam sets for L1-RSRP measurement/reporting are configured separately.

<Case 1>

In case 1, the BPL sets for PDCCH monitoring are configured equal to the BPL sets for BPL monitoring, the BPL sets for PDSCH receipt are configured equal to the BPL sets for CSI measurement/reporting, the BPL sets for CSI measurement/reporting are configured equal to the BPL sets for L1-RSRP measurement/reporting, and the BPL sets for PDCCH monitoring are configured equal to the BPL sets for PDSCH receipt.

In case 1, the radio base station configures, for a user terminal, one or more BPL sets that apply in common to PDCCH monitoring, BPL monitoring, PDSCH receipt, CSI measurement/reporting and L1-RSRP measurement/reporting, by using higher layer signaling.

Figure 4:
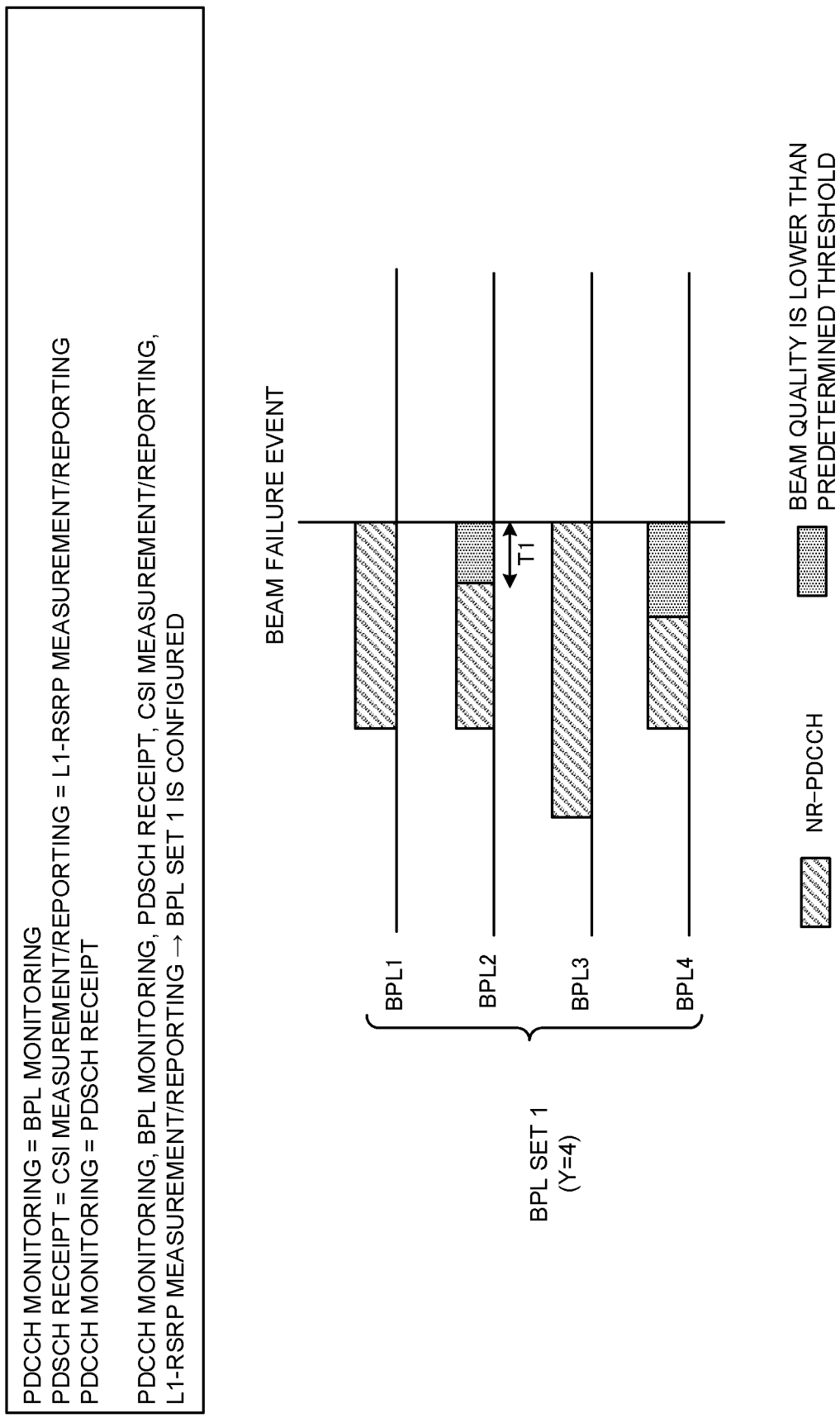
FIG. 4 is a diagram to show an example of case 1 according to a first example of the present invention.

FIG. 4 is a diagram to show an example of case 1 according to a first example of the present invention. In FIG. 4, the radio base station configures a single BPL set that applies in common to PDCCH monitoring, BPL monitoring, PDSCH receipt, CSI measurement/reporting, and L1-RSRP measurement/reporting, in the user terminal. In FIG. 4, this common BPL set includes Y (here, Y=4) BPLs. Note that the radio base station may transmit the NR-PDCCH by using at least one of the Y BPLs, or change the BPLs for PDCCH transmission on a dynamic basis.

For example, in FIG. 4, a beam failure event occurs when the state in which the beam quality (for example, the RSRP and/or the RSRQ) of X BPLs (X≤Y, and X=2 here), out of Y BPLs, is lower than a predetermined threshold continues for or more than a period T1. When a beam failure event occurs, the user terminal reports a beam recovery signal (for example, 1 bit), which indicates that a beam failure has occurred, to the radio base station.

In FIG. 4, when the radio base station receives a beam recovery signal from the user terminal, the radio base station may configure a new BPL set for the user terminal by way of higher layer signaling. This BPL set may be selected based on the result of rough beam measurements at the user terminal (see FIG. 1A).

Also, in case 1, when receiving a beam recovery signal from the user terminal, the radio base station may fall back to PDCCH transmission using rough beams based on a rough beam measurement report from the user terminal (see FIG. 1A). In this case, the radio base station may configure, in the user terminal, information that is needed to receive the PDCCH by using rough beams (for example, the time and/or frequency resources for the PDCCH, the configuration of the CSI-RS (CSI-RS resource) for CSI measurement/reporting, etc.).

Figure 5:
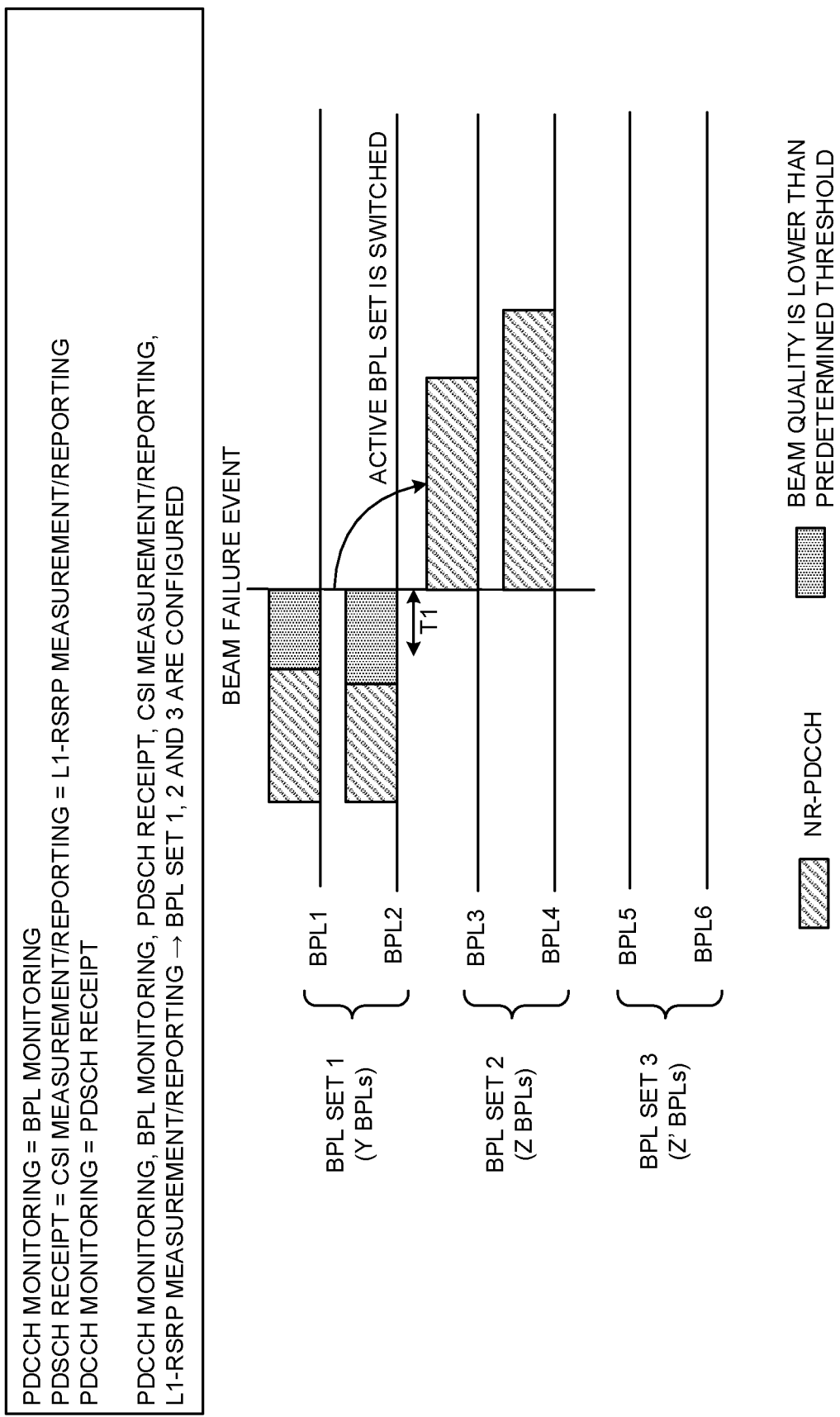
FIG. 5 is a diagram to show another example of case 1 according to the first example.

FIG. 5 is a diagram to show another example of case 1 according to the first example. In FIG. 5, the radio base station configures a single BPL set that applies in common to PDCCH monitoring, BPL monitoring, PDSCH receipt, CSI measurement/reporting and L1-RSRP measurement/reporting, in the user terminal. The radio base station may report one or more BPL sets to use (also referred to as "active BPL sets"), among these multiple BPL sets, by using a MAC control element (MAC CE) or DCI.

For example, in FIG. 5, 3 BPL sets 1 to 3, which apply in common to PDCCH monitoring, BPL monitoring, PDSCH receipt, CSI measurement/reporting, and L1-RSRP measurement/reporting, are configured. BPL sets 1, 2 and 3 include X, Y and Z' BPLs, respectively. Here Y=Z=Z'=2 holds, but this is by no means limiting. Also, assume that, BPL set 1 is reported to the user terminal as an active BPL set, by using a MAC CE or DCI.

Referring to FIG. 5, a beam failure event occurs when the state in which the beam quality of X (X≤Y, and X=2 here) BPLs among the Y BPLs constituting BPL set 1 is below a predetermined threshold continues for or more than a period T1. The user terminal transmits a beam recovery signal (for example, 1 bit) to the radio base station.

When the radio base station receives a beam recovery signal from the user terminal, the radio base station transmits a MAC CE or DCI that carries a command to change an active BPL set to another BPL set. Note that which BPL set the active BPL set is switched to may be selected based on an L3 measurement result (for example, L3-RSRP). For example, in the event of FIG. 5, the active BPL set changes from BPL set 1 to BPL set 2.

Alternatively, the radio base station may transmit a MAC CE or DCI that carries information for triggering L1-RSRP measurement/reporting and/or CSI measurement/reporting for other BPL sets (here, BPL sets 2 and 3).

When the number of BPLs, Y, in the active BPL set is greater than the above threshold X for triggering a beam failure event, this MAC CE or DCI may be transmitted in other Y to X BPLs in this active BPL set. On the other hand, when the number of BPLs is equal to the above threshold X, the MAC CE or DCI may be transmitted in rough beam selected based on a predetermined rule. Note that DCI may be transmitted in user terminal-specific search spaces (also referred to as "USS (UE-specific Search Spaces)"), or may be transmitted in a search space that is shared in common by one or more user terminals that constitute a group (also referred to as a "CSS (Common Search Space)," "group search space," etc.).

According to case 1, BPL sets that are used in common in PDCCH monitoring, BPL monitoring, PDSCH receipt, CSI measurement/reporting and L1-RSRP measurement/reporting are configured, so that it is possible to make configuration of BPL sets efficient, and switch the BPL sets when beam failures are detected.

<Case 2>

In case 2, similar to the case 1, the BPL sets for PDCCH monitoring are configured equal to the BPL sets for BPL monitoring, the BPL sets for PDSCH receipt are configured equal to the BPL sets for CSI measurement/reporting, and the BPL sets for CSI measurement/reporting are configured equal to the BPL sets for L1-RSRP measurement/reporting. Meanwhile, case 2 is different from case 1 in that the BPL sets for PDCCH monitoring are included in the BPL sets for PDSCH receipt. Differences from case 1 will be primarily described below.

In case 2, the radio base station configures, for a user terminal, one or more BPL sets that apply in common to PDCCH monitoring and BPL monitoring, by using higher layer signaling. The radio base station may report the active BPL sets for PDCCH monitoring and BPL monitoring, to the user terminal, by using a MAC CE or DCI.

Furthermore, the radio base station configures a number of BPL sets that apply in common to PDSCH receipt, CSI measurement/reporting and L1-RSRP measurement/reporting, by using higher layer signaling. These multiple BPL sets include a BPL set configured for PDCCH monitoring and BPL monitoring, and other BPL sets. The radio base station may report active BPL sets that are common at least between 2 of PDSCH receipt, CSI measurement/reporting, and L1-RSRP measurement/reporting, or report individual active BPL sets, to the user terminal, by using a MAC CE or DCI.

Figure 6:
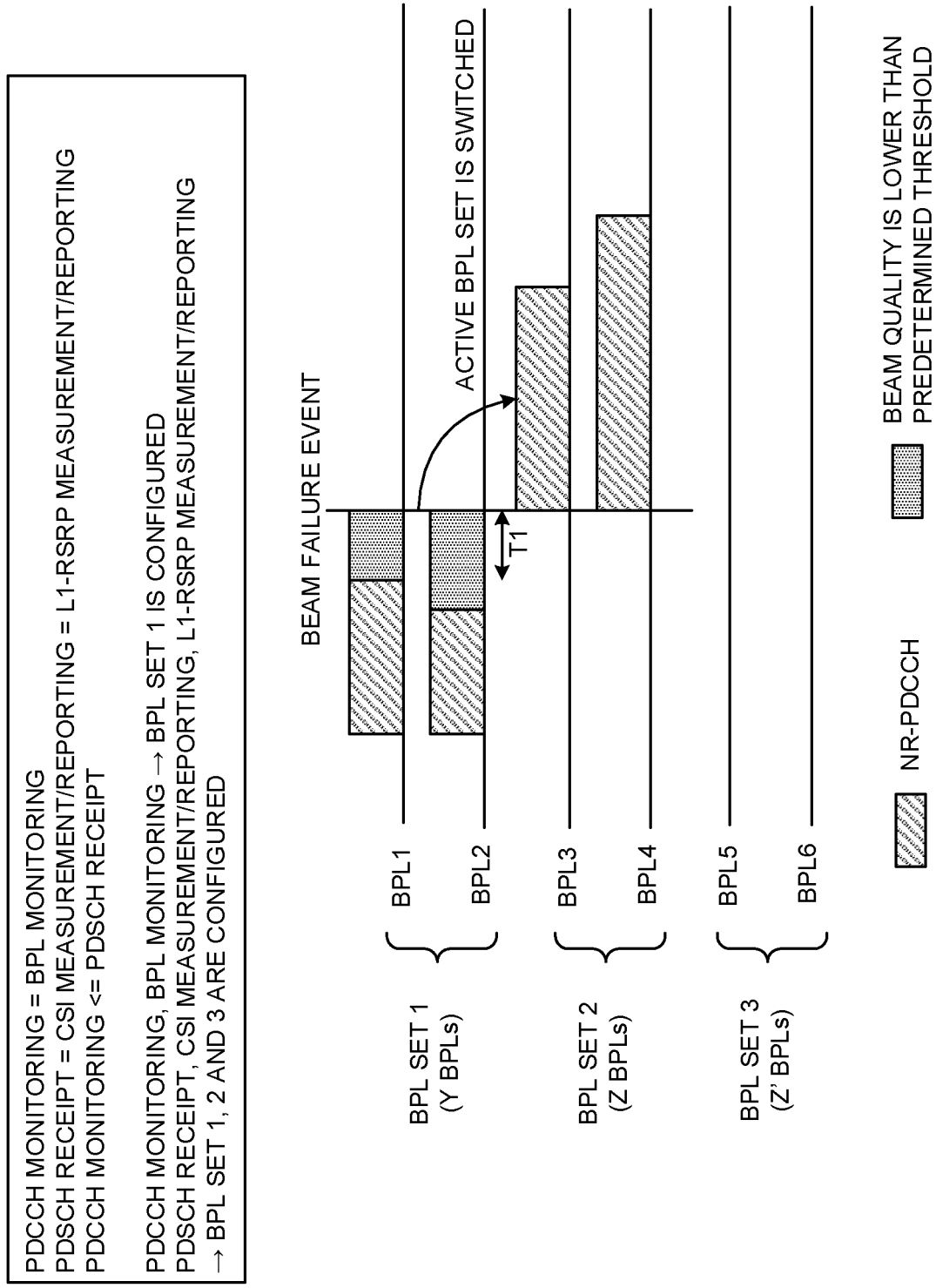
FIG. 6 is a diagram to show an example of case 2 according to the first example.

FIG. 6 is a diagram to show an example of case 2 according to the first example of the present invention. In FIG. 6, the radio base station configures BPL set 1 for PDCCH monitoring and BPL monitoring in common. Also, the radio base station configures BPL sets 1 to 3, in the user terminal, for PDSCH receipt, CSI measurement/reporting and L1-RSRP measurement/reporting, in common. BPL sets 1, 2 and 3 include Y, Z and Z' BPLs, respectively. Here Y=Z=Z'=2 holds, but this is by no means limiting.

Referring to FIG. 6, a beam failure event occurs when the state in which the beam quality of X (X≤Y, and X=2 here) BPLs among the Y BPLs constituting BPL set 1 is below a predetermined threshold continues for or more than a period T1. The user terminal transmits a UL signal (for example, 1 bit), which indicates that a beam failure has occurred, to the radio base station.

When the radio base station receives the UL signal to indicate that a beam failure has occurred, the radio base station transmits a MAC CE or DCI that carries a command to change an active BPL set to another BPL set. In FIG. 6, BPL sets 1 to 3 are configured for CSI measurement/reporting and L1-RSRP measurement/reporting, so that the radio base station can decide which BPL set to switch the active BPL set to, based on the CSI and/or L1-RSRP of each BPL in BPL sets 1 to 3.

For example, in FIG. 6, the active BPL set for PDCCH monitoring and BPL monitoring is changed from BPL set 1 to BPL set 2. Also, the radio base station may update the active BPL set for CSI measurement/reporting and/or L1-RSRP measurement/reporting by using a MAC CE or DCI.

In case 2, a larger number BPL sets are configured for common use in PDSCH receipt, CSI measurement/reporting and L1-RSRP measurement/reporting, than the common BPL sets for PDCCH monitoring and BPL monitoring, so that it is possible to switch the BPL sets properly and quickly when a beam failure occurs.

<Case 3>

In case 3, similar to the case 1, the BPL sets for PDCCH monitoring are configured equal to the BPL sets for BPL monitoring, the BPL sets for PDSCH receipt are configured equal to the BPL sets for CSI measurement/reporting, and the BPL sets for CSI measurement/reporting are configured equal to the BPL sets for L1-RSRP measurement/reporting. Meanwhile, case 3 is different from case 1 in that the BPL sets for PDCCH monitoring are included in the BPL sets for PDCCH monitoring. Differences from case 1 will be primarily described below.

In case 3, the radio base station configures, for a user terminal, a number of BPL sets that apply in common to PDCCH monitoring and BPL monitoring, by using higher layer signaling. The radio base station may report the active BPL sets for PDCCH monitoring and BPL monitoring, to the user terminal, by using a MAC CE or DCI.

Also, the radio base station configures, in at least one of these multiple BPL sets, a subset that applies in common to PDSCH receipt, CSI measurement/reporting and L1-RSRP measurement/reporting, by using higher layer signaling. The radio base station may report subsets (active subsets) for use in PDSCH receipt, CSI measurement/reporting and L1-RSRP measurement/reporting, to the user terminal, by using a MAC CE or DCI.

Figure 7:
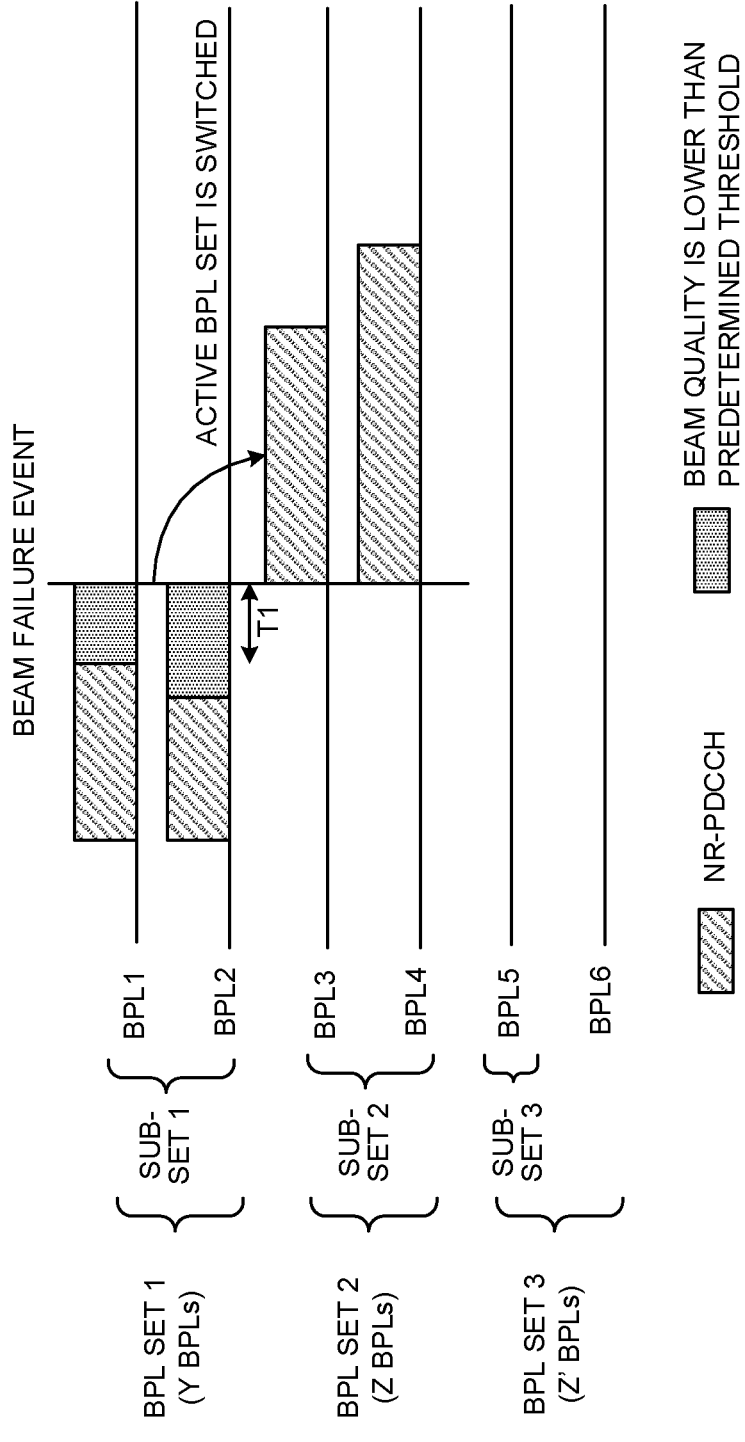
FIG. 7 is a diagram to show an example of case 3 according to the first example.

FIG. 7 is a diagram to show an example of case 3 according to the first example of the present invention. For example, in FIG. 7, the radio base station configures BPL sets 1, 2 and 3 for PDCCH monitoring and for BPL monitoring, in common, in the user terminal. Also, the radio base station configures BPL sets 1 to 3, in the user terminal, for PDSCH receipt, CSI measurement/reporting and L1-RSRP measurement/reporting, in common.

BPL sets 1, 2 and 3 include Y, Z and Z' BPLs, respectively. Here Y=Z=Z'=2 holds, but this is by no means limiting. Subset 1 of BPL set 1 contains Y or fewer BPLs (here, BPLs 1 and 2), subset 2 of BPL set 2 contains Z or fewer BPLs (here, BPLs 3 and 4), and subset 3 of BPL set 3 contains Z' or fewer BPLs (here, BPL 5).

Assume that, in FIG. 7, BPL set 1 is the active BPL set for PDCCH monitoring and BPL monitoring. Also, assume that BPL sets 1 to 3 are the active subsets for PDSCH receipt, CSI measurement/reporting and L1-RSRP measurement/reporting.

Referring to FIG. 5, a beam failure event occurs when the state in which the beam quality of X (X≤Y, and X=2 here)

BPLs among the Y BPLs constituting BPL set 1 is below a predetermined threshold continues for or more than period T1. The user terminal transmits a beam recovery signal (for example, 1 bit) to the radio base station.

When the radio base station receives a beam recovery signal from the user terminal, the radio base station transmits a MAC CE or DCI that carries a command to change an active BPL set to another BPL set. In FIG. 7, subsets 1, 2 and 3 are configured for CSI measurement/reporting and L1-RSRP measurement/reporting, and these subsets 1, 2, and 3 are the active subsets. Consequently, to which BPL set the active BPL set can be switched to can be determined based on the CSI and/or L1-RSRP of each BPL of subsets 1 to 3. Alternatively, to which BPL set the active BPL set can be switched to may be determined based on L3-RSRP as well.

For example, in FIG. 7, the active BPL set for PDCCH monitoring and BPL monitoring is changed from BPL set 1 to BPL set 2. Also, the radio base station may update the active BPL set for CSI measurement/reporting and/or L1-RSRP measurement/reporting by using a MAC CE or DCI.

In case 3, in at least one of the BPL sets that are used in PDCCH monitoring and BPL monitoring in common, a subset that is used in common in PDSCH receipt, CSI measurement/reporting and L1-RSRP measurement/reporting is configured, so that the load of CSI measurement/reporting and/or L1-RSRP measurement/reporting at the user terminal can be reduced based on L1-RSRP.

<Case 4>

In case 4, similar to the case 1 to case 3, the BPL sets for PDCCH monitoring are configured equal to the BPL sets for BPL monitoring, and the BPL sets for PDSCH receipt are configured equal to the BPL sets for CSI measurement/reporting. Meanwhile, case 4 is different from case 1 to case 3 in that the BPL sets for CSI measurement/reporting are included in the BPL sets for L1-RSRP measurement/reporting. Differences from case 1 will be primarily described below.

In case 4, the radio base station configures, for a user terminal, one or more BPL sets that apply in common to PDCCH monitoring, BPL monitoring, PDSCH receipt and CSI measurement/reporting, by using higher layer signaling. The radio base station may report active BPL sets that are common at least between 2 of PDCCH monitoring, BPL monitoring, PDSCH receipt and CSI measurement/reporting, or report individual active BPL sets, to the user terminal, by using a MAC CE or DCI.

Also, the radio base station configures multiple BPL sets for L1-RSRP measurement/reporting by using higher layer signaling. These multiple BPL sets may include BPL sets that are configured for PDCCH monitoring, BPL monitoring, PDSCH receipt and CSI measurement/reporting, and, in addition, other BPL sets.

Figure 8:
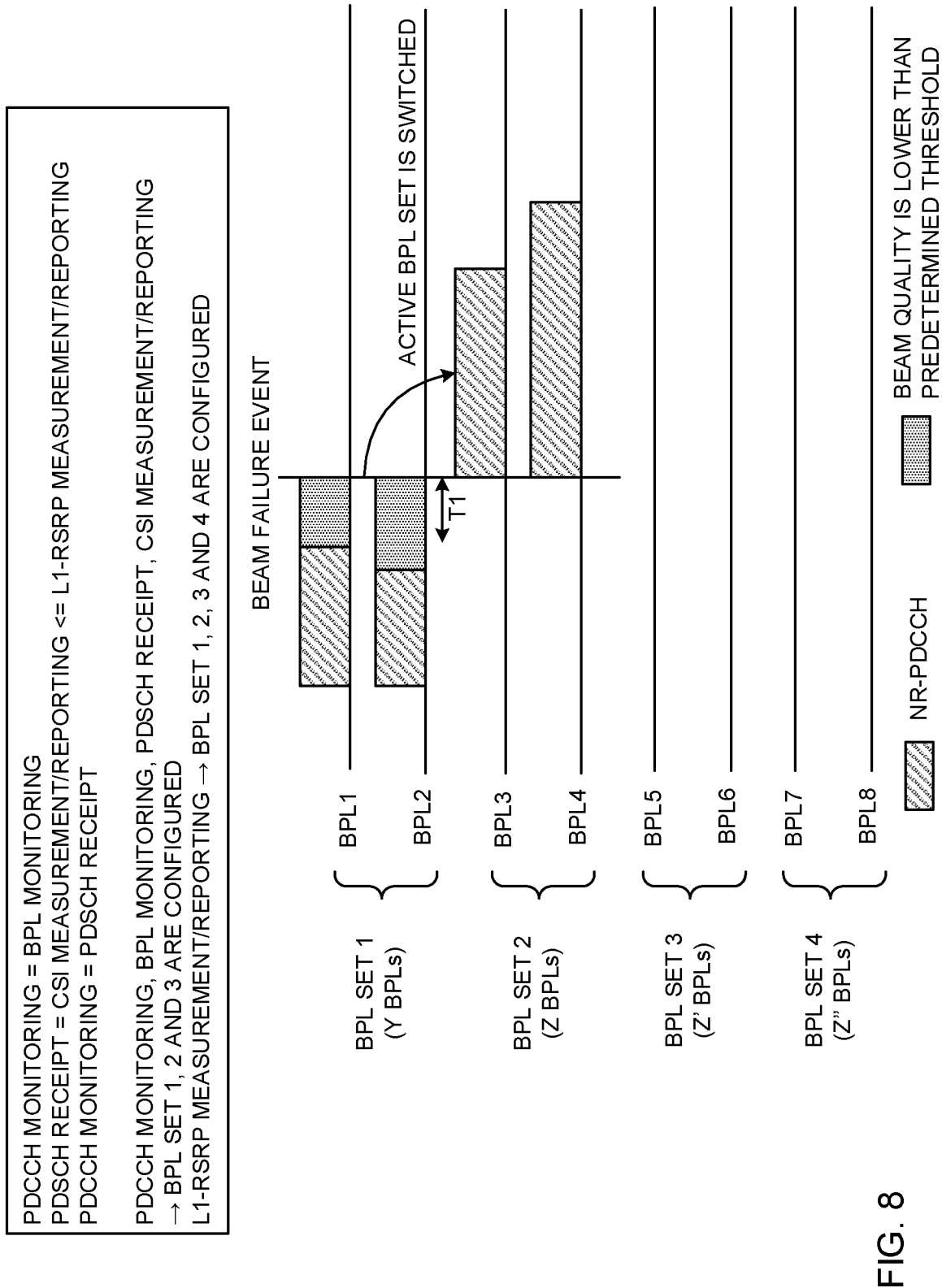
FIG. 8 is a diagram to show an example of case 4 according to the first example.

FIG. 8 is a diagram to show an example of case 4 according to the first example of the present invention. For example, in FIG. 8, the radio base station configures BPL sets 1 to 3 for PDCCH monitoring, BPL monitoring, PDSCH receipt, CSI measurement/reporting, in common. Also, the radio base station configures BPL sets 1 to 4 for L1-RSRP measurement/reporting.

BPL sets 1, 2, 3 and 4 include Y, Z, Z' and Z" BPLs, respectively. Here Y=Z=Z'=Z"=2 holds, but this is by no means limiting. Also, assume that, in FIG. 8, BPL set 1 is the active BPL set for PDCCH monitoring, BPL monitoring, PDSCH receipt and CSI measurement/reporting.

Referring to FIG. 8, a beam failure event occurs when the state in which the beam quality of X (X≤Y, and X=2 here) BPLs among the Y BPLs constituting BPL set 1 is below a predetermined threshold continues for or more than a period T1. The user terminal transmits a beam recovery signal (for example, 1 bit) to the radio base station.

When the radio base station receives a beam recovery signal from the user terminal, the radio base station transmits a MAC CE or DCI that carries a command to change an active BPL set to another BPL set. In FIG. 8, BPL sets 1 to 4 are configured for L1-RSRP measurement/reporting. The radio base station decides which BPL set to switch the active BPL set to, based on the L1-RSRP of each BPL in BPL sets 1 to 4. For example, in FIG. 8, the active BPL set for PDCCH monitoring, BPL monitoring and PDSCH receipt and CSI measurement/reporting is changed from BPL set 1 to BPL set 2.

In case 4, a larger number BPL sets for L1-RSRP measurement/reporting are configured than the BPL set used in common in PDSCH monitoring, BPL monitoring, PDSCH receipt and CSI measurement/reporting, so that it is possible to switch BPL sets properly and quickly when a beam failure occurs.

<Case 5>

In case 5, similar to the case 4, the BPL sets for PDSCH receipt are configured equal to the BPL sets for BPL monitoring, and equal to the BPL sets for CSI measurement/reporting, and the BPL sets for CSI measurement/reporting are configured equal to the BPL sets for L1-RSRP measurement/reporting. Meanwhile, case 5 is different from case 4 in that the BPL sets for PDCCH monitoring are included in the BPL sets for PDSCH receipt. Differences from case 4 will be primarily described below.

In case 5, the radio base station configures, for a user terminal, one or more BPL sets that apply in common to PDCCH monitoring and BPL monitoring, by using higher layer signaling. The radio base station may report the active BPL sets for PDCCH monitoring and BPL monitoring, to the user terminal, by using a MAC CE or DCI.

Also, the radio base station configures one or more BPL sets that apply in common to PDSCH receipt and CSI measurement/reporting, by using higher layer signaling. These multiple BPL sets may include BPL sets that are configured for PDCCH monitoring and BPL monitoring, and, in addition, other BPL sets. The radio base station may report active BPL sets that apply ion common to PDSCH receipt and CSI measurement/reporting, or report individual active BPL sets, to the user terminal, by using a MAC CE or DCI.

Also, the radio base station configures multiple BPL sets for L1-RSRP measurement/reporting by using higher layer signaling. These multiple BPL sets may include a BPL set configured for PDCCH monitoring and BPL monitoring and/or a BPL set configured for PDSCH receipt and CSI measurement/reporting and, in addition, other BPL sets.

Figure 9:
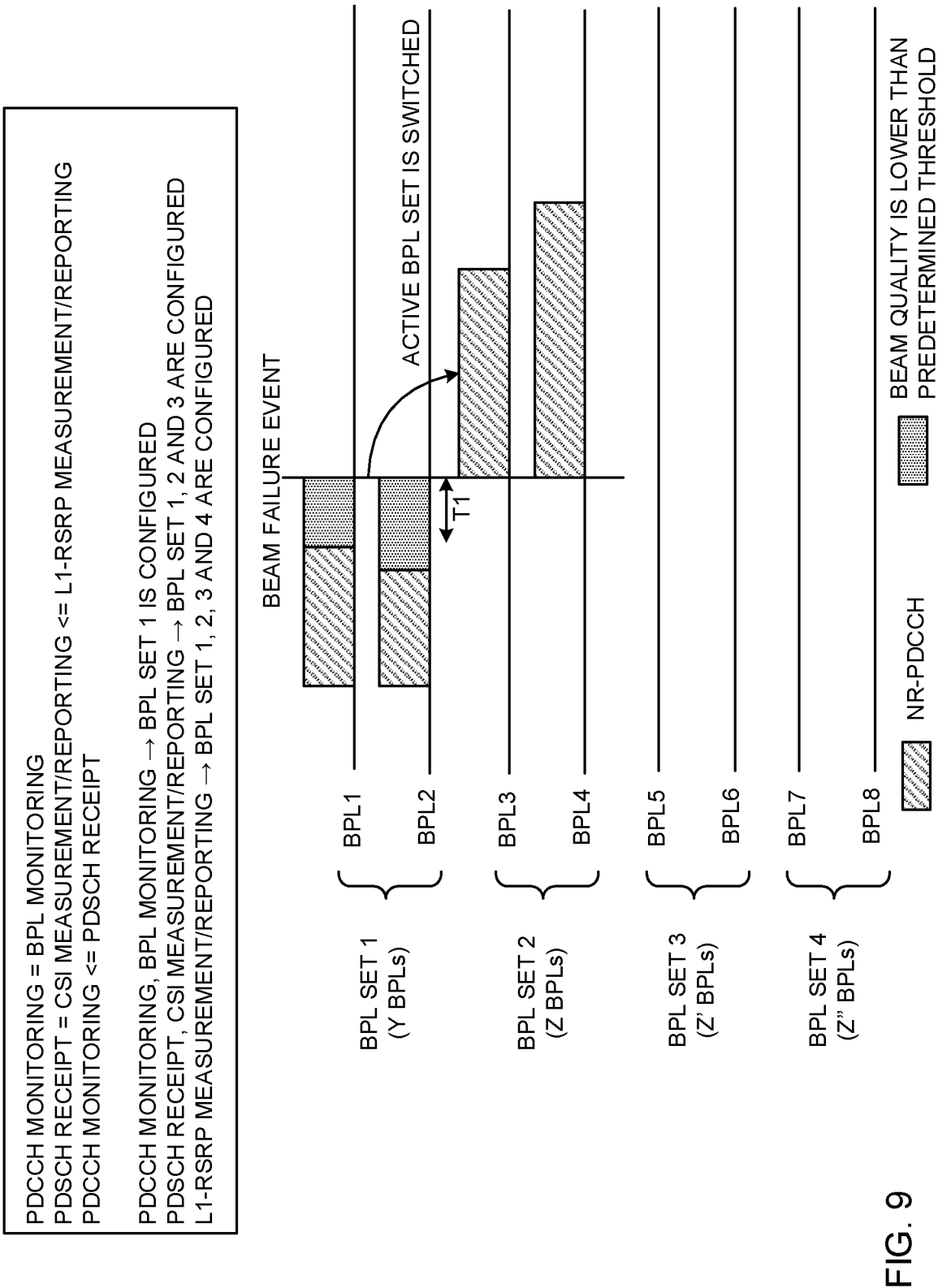
FIG. 9 is a diagram to show an example of case 5 according to the first example.

FIG. 9 is a diagram to show an example of case 5 according to the first example of the present invention. For example, in FIG. 9, the radio base station configures BPL sets 1, 2 and 3 for PDCCH monitoring and for BPL monitoring, in common, in the user terminal. Also, the radio base station configures BPL sets 1 to 3, in the user terminal, for PDSCH receipt, CSI measurement/reporting. Also, the radio base station configures BPL sets 1 to 4 in the user terminal for 1-RSRP measurement/reporting.

BPL sets 1, 2, 3 and 4 include Y, Z, Z' and Z" BPLs, respectively. Here, Y=Z=Z'=Z"=2 holds, but this is by no means limiting. Also, assume that, in FIG. 9, BPL set 1 is the active BPL set for PDCCH monitoring, BPL monitoring, PDSCH receipt and CSI measurement/reporting.

Referring to FIG. 9, a beam failure event occurs when the state in which the beam quality of X (X≤Y, and X=2 here) BPLs among the Y BPLs constituting BPL set 1 is below a predetermined threshold continues for or more than a period T1. The user terminal transmits a beam recovery signal (for example, 1 bit) to the radio base station.

When the radio base station receives a beam recovery signal from the user terminal, the radio base station transmits a MAC CE or DCI that carries a command to change an active BPL set to another BPL set. In FIG. 9, BPL sets 1 to 4 are configured for L1-RSRP measurement/reporting. The radio base station decides which BPL set to switch the active BPL set to, based on the L1-RSRP of each BPL in BPL sets 1 to 4. For example, in FIG. 9, the active BPL set for PDCCH monitoring and BPL monitoring is changed from BPL set 1 to BPL set 2.

In case 5, a larger number BPL sets for common use in PDSCH receipt and CSI measurement/reporting than the BPL sets that are used in PDCCH monitoring and BPL monitoring in common are configured, so that it is possible to switch BPL sets properly and quickly when a beam failure occurs.

<Case 6>

In case 6, similar to the case 4, the BPL sets for PDSCH receipt are configured equal to the BPL sets for BPL monitoring, and equal to the BPL sets for CSI measurement/reporting, and the BPL sets for CSI measurement/reporting are configured equal to the BPL sets for L1-RSRP measurement/reporting. Meanwhile, case 6 is different from case 1 in that the BPL sets for PDCCH receipt are included in the BPL sets for PDCCH monitoring. Differences from case 4 will be primarily described below.

In case 6, the radio base station configures, for a user terminal, multiple BPL sets that apply in common to PDCCH monitoring and BPL monitoring, by using higher layer signaling. The radio base station may report the active BPL sets for PDCCH monitoring and BPL monitoring, to the user terminal, by using a MAC CE or DCI.

Also, the radio base station configures, in at least one of these multiple BPL sets, a subset that applies in common to PDSCH receipt and CSI measurement/reporting, by using higher layer signaling. The radio base station may report a subset to use in PDSCH receipt, CSI measurement/reporting and L1-RSRP measurement/reporting, to the user terminal, by using a MAC CE or DCI.

Also, the radio base station configures multiple BPL sets for L1-RSRP measurement/reporting, in the user terminal, by using higher layer signaling. These multiple BPL sets may include BPL sets configured for PDCCH monitoring and BPL monitoring, and, in addition, other BPL sets.

Figure 10:
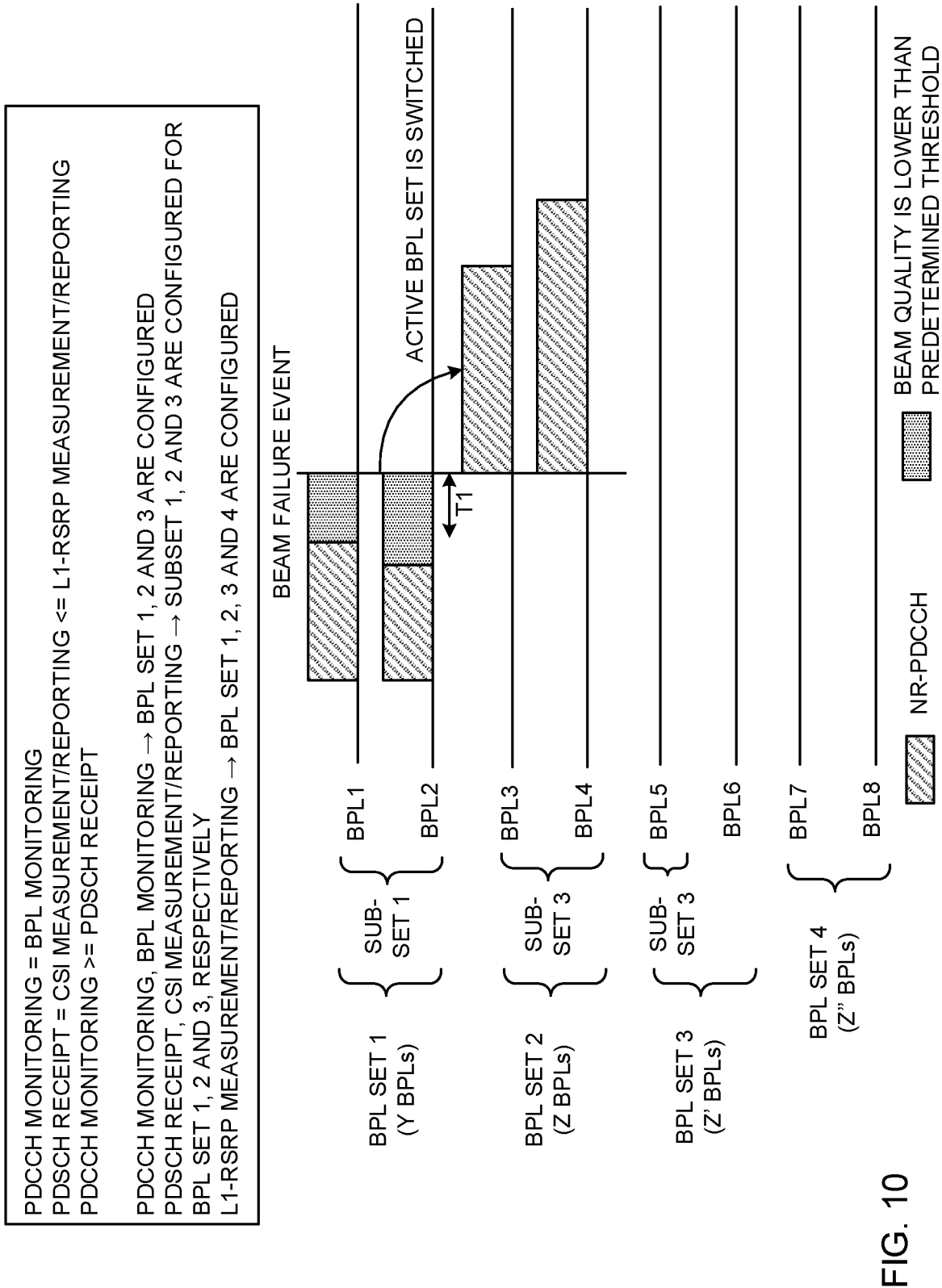
FIG. 10 is a diagram to show an example of case 6 according to the first example.

FIG. 10 is a diagram to show an example of case 6 according to the first example of the present invention. For example, in FIG. 10, the radio base station configures BPL sets 1, 2 and 3 for PDCCH monitoring and for BPL monitoring, in common, in the user terminal. Also, the radio base station configures BPL sets 1 to 3, in the user terminal, for PDSCH receipt and CSI measurement/reporting, in common. Also, the radio base station configures BPL sets 1 to 4, for L1-RSRP measurement/reporting, in the user terminal.

BPL sets 1, 2, 3 and 4 include Y, Z, Z' and Z'' BPLs, respectively. Here Y=Z=Z'=2 holds, but this is by no means limiting. Subset 1 of BPL set 1 contains Y or fewer BPLs (here, BPLs 1 and 2), subset 2 of BPL set 2 contains Z or fewer BPLs (here, BPLs 3 and 4), and subset 3 of BPL set 3 contains Z' or fewer BPLs (here, BPL 5).

Also, assume that, in FIG. 10, BPL set 1 is the active BPL set for PDCCH monitoring and BPL monitoring. Also, assume that BPL sets 1 to 3 are the active subsets for PDSCH receipt and CSI measurement/reporting.

Referring to FIG. 10, a beam failure event occurs when the state in which the beam quality of X (X≤Y, and X=2 here) BPLs among the Y BPLs constituting BPL set 1 is below a predetermined threshold continues for or more than period T1. The user terminal transmits a UL signal (for example, 1 bit), which indicates that a beam failure has occurred, to the radio base station.

When the radio base station receives the UL signal to indicate that a beam failure has occurred, the radio base station transmits a MAC CE or DCI that carries a command to change an active BPL set to another BPL set. In FIG. 10, BPL sets 1 to 4 are configured for L1-RSRP measurement/reporting. The radio base station decides which BPL set to switch the active BPL set to, based on the L1-RSRP of each BPL in BPL sets 1 to 4. For example, in FIG. 6, the active BPL set for PDCCH monitoring and BPL monitoring is changed from BPL set 1 to BPL set 2.

In case 6, a larger number of BPL sets for L1-RSRP measurement/reporting are configured than the BPL sets that apply in common to PDCCH monitoring and BPL monitoring, so that it is possible to switch BPL sets properly and quickly when a beam failure occurs.

As described above, according to the first example, the relationship between each beam set for BPL monitoring, PDCCH monitoring, PDSCH receipt, CSI measurement/reporting and L1-RSRP measurement/reporting is defined, so that BPL sets can be configured efficiently.

Second Example

With second example, conditions for detecting a beam failure (conditions for a beam failure event) will be described.

As has been explained with the first example, studies are in progress to generate a beam failure event when the state in which the quality of X (X≤Y) BPLs, among Y BPLs in an active BPL set, is below a predetermined threshold continues for or more than a predetermined period. If a beam failure event is generated based on this condition, beam recovery may be triggered even when there are no BPLs available for use other than the above Y BPLs, and this might result in a failure of beam recovery.

So, according to the second example, the conditions for a beam failure event are configured based not only on the quality of BPLs in an active BPL set, but also on the quality of BPLs in a BPL set that serves as a candidate for switching the active BPL set to (also referred to as a "backup BPL set," a "candidate BPL set," a "non-active BPL set," etc.).

Now, the first to third conditions for a beam failure event according to a second example of the present invention will be described below. To be more specific, the first to third conditions, which will be described below, are configured so that the BPL sets for PDCCH monitoring are included in the BPL sets for BPL monitoring. Furthermore, according to the second example, the radio base station configures BPL sets for PDCCH monitoring and BPL sets for BPL monitoring, in a user terminal, by using higher layer signaling. Also, the following first to third conditions may be configured in the user terminal through higher layer signaling (for example, RRC signaling).

<First Condition>

According to the first condition, even when a period T1 has not passed since the quality of X (X≤Y) BPLs, among Y BPLs in an active BPL set, fell below a predetermined threshold, if a period T2 has passed after the quality of P (P≤Z) BPLs among Z BPLs in a backup BPL set reached a predetermined threshold, a beam failure event is generated.

Figure 11:
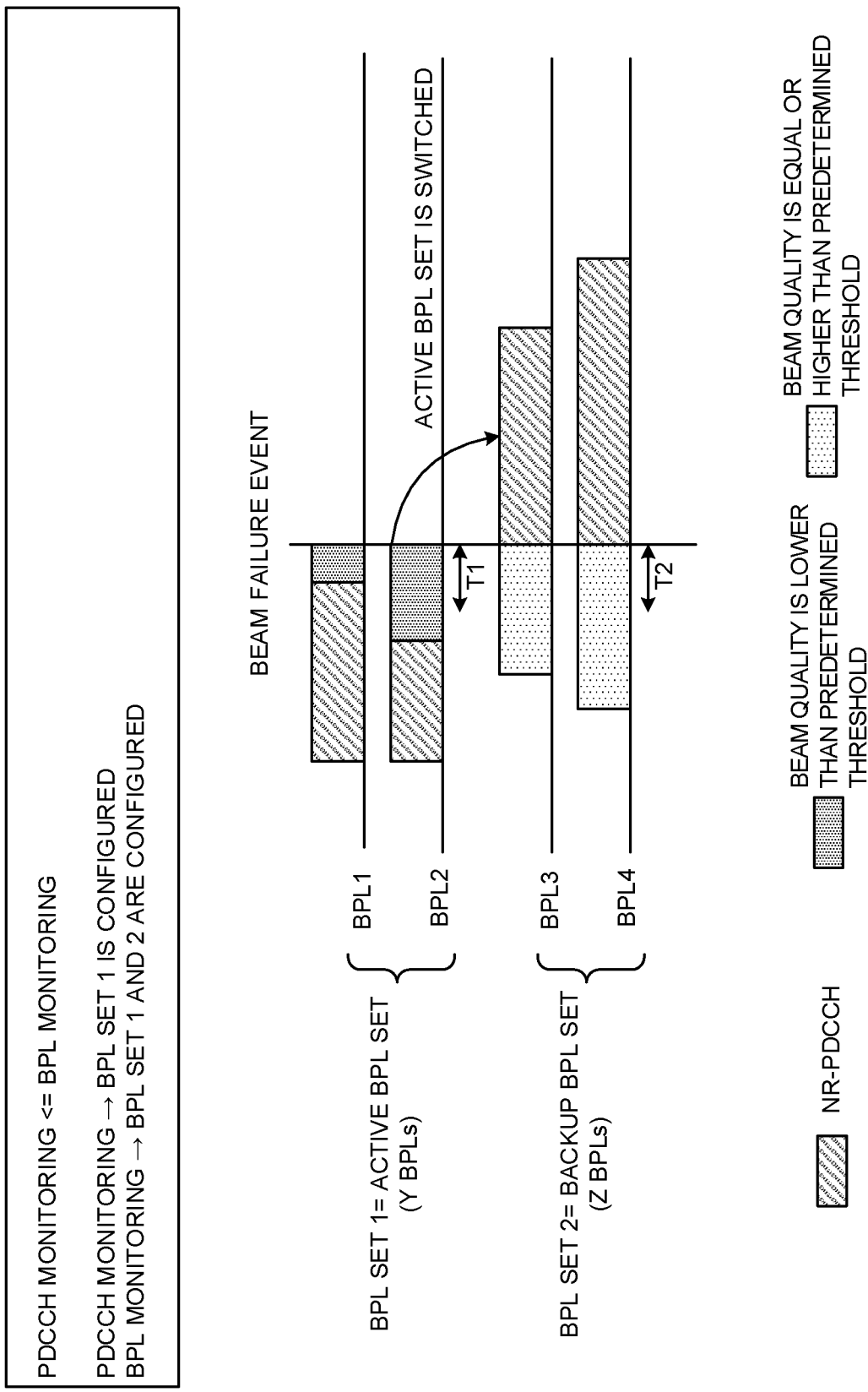
FIG. 11 is a diagram to show an example of a first condition for a beam failure event according to a second example of the present invention.

FIG. 11 is a diagram to show an example of the first condition for a beam failure event according to the second example of the present invention. For example, FIG. 11 assumes that BPL set 1 is configured for PDCCH monitoring, and BPL sets 1 and 2 are configured for BPL monitoring. BPL sets 1 and 2 include Y and Z BPLs, respectively. Here Y=Z=2 holds, but this is by no means limiting. Furthermore, in FIG. 11, the above thresholds X and P are both 2, but this is by no means limiting as long as X≤Y and P≤Z hold.

In FIG. 11, a period T1 or more has passed since the quality of BPL 2 in the active BPL set (BPL set 1) fell below a predetermined threshold, but a period T2 or more has not passed after the quality of BPL 1 fell below the predetermined threshold. Meanwhile, the period T2 or more has passed after the quality of P BPLs—namely, BPLs 3 and 4—in the backup BPL set (BPL set 2) became better than a predetermined threshold. Thus, the user terminal generates a beam failure event regardless of the state of the active BPL set, and transmits a beam recovery signal to the radio base station.

<Second Condition>

According to the first condition, even when a period T1 has not passed since the quality of X (X≤Y) BPLs, among Y BPLs in an active BPL set, fell below a predetermined threshold, if a period T2 has passed after the quality of P (P≤Z) BPLs among Z BPLs in a backup BPL set reached a predetermined threshold, a beam failure event is generated.

Figure 12:
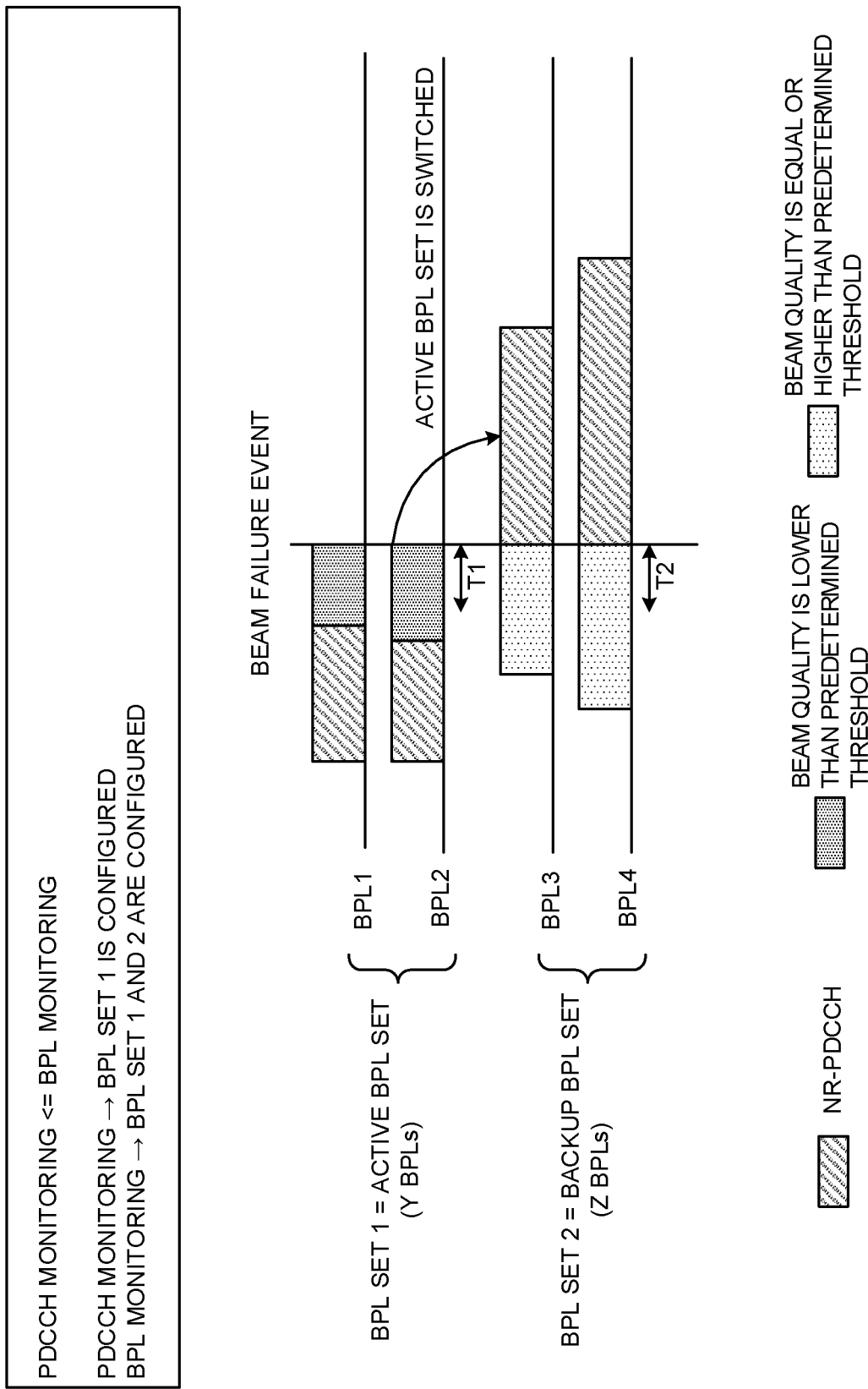
FIG. 12 is a diagram to show an example of a second condition for a beam failure event according to the second example.

FIG. 11 is a diagram to show an example of a first condition for a beam failure event according to a second example of the present invention. FIG. 12 is similar to FIG. 11 except that the period T1 or more has passed since the quality of BPL 1 fell below a predetermined threshold.

In FIG. 12, a period T1 or more has passed since the quality of X BPLs 1 and 2 in an active BPL set (BPL set 1) fell below a predetermined threshold, and a period T2 or more has passed after the quality of P BPLs—namely, BPLs 3 and 4—in the backup BPL set (BPL set 2) became better than the predetermined threshold. Thus, the user terminal generates a beam failure event regardless of the state of the active BPL set, and transmits a beam recovery signal to the radio base station.

<Third Condition>

According to the third condition, when the quality of P BPLs in a backup BPL set is better the quality of the best BPL among Y BPLs in an active BPL set by a predetermined offset or more, a beam failure event is produced.

Figure 13:
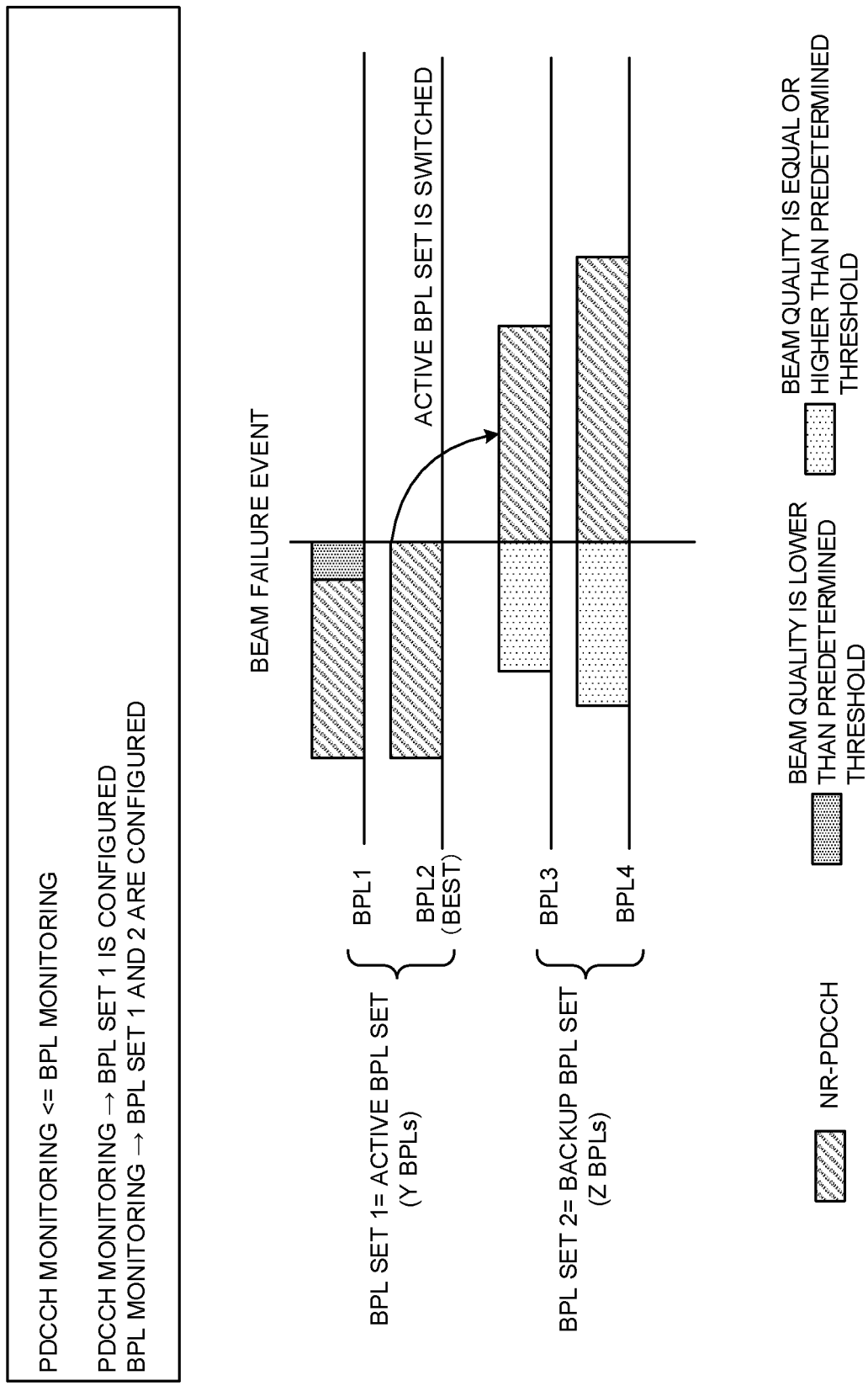
FIG. 13 is a diagram to show an example of a third condition for a beam failure event according to the second example.

FIG. 13 is a diagram to show an example of the third condition for a beam failure event according to the second example of the present invention. FIG. 13 assumes that the quality of BPL 2 is the best in the active BPL set (BPL set 1). The rest of the conditions are the same as in FIG. 11.

In FIG. 13, the quality of P BPLs—namely, BPLs 3 and 4—in a backup set BPL set is better than the quality of BPL 2 by a predetermined offset or more. Thus, the user terminal generates a beam failure event, and transmits a beam recovery signal to the radio base station.

According to the second example, the conditions for a beam failure event are configured based not only on the quality of BPLs in an active BPL set, but also on the quality of BPLs in a BPL set that serves as a candidate for switching the active BPL set to (also referred to as a "backup BPL set," a "candidate BPL set," etc.). Consequently, it is possible to prevent beam recovery from being triggered when there are no BPLs available for use other than Y BPLs in an active BPL set.

Third Example

A third example of the present invention will describe below what UL signal is used as the beam recovery signal and/or how this beam recovery signal is transmitted.

<Content of Beam Recovery Signal>

The beam recovery signal is a signal to indicate that a beam failure has been detected (a beam failure event has occurred) in a user terminal. This beam recovery signal may be, for example, 1-bit explicit information or may be information that implicitly indicates that a beam failure has been detected.

Furthermore, the beam recovery signal may indicate that a beam failure has been detected in a user terminal, and may also indicate the beam ID of one or more candidate beams to switch to (or the ID of a beam group comprised of one or more beams). This beam ID (or beam group ID) may be any information as long as it represents a beam (or a beam group) (for example, a CRI to show a CSI-RS resource associated with a beam).

Also, one or more candidate beams to switch to may be rough beams (for example, beams B1 to B3 in FIG. 1A) or finer beams (for example, Tx beams B21 to B24 in FIG. 1B).

Note that, when a DL beam failure (L1/L2 beam failure) is detected in the user terminal, it may be estimated that a UL beam failure (L1/L2 beam failure) has occurred, or a DL beam failure and a UL beam failure may be detected separately.

<Transmission of Beam Recovery Signal>

For example, one of (1) a physical random access channel (PRACH preamble (also referred to as a "RACH preamble"), (2) a sounding reference signal (SRS), (3) a UL scheduling request (SR), (4) a PUSCH that is scheduled by DCI (UL grant) from the radio base station in response to an SR, and (5) a PUCCH can be used as a beam recovery signal.

(1) When a RACH preamble is used as a beam recovery signal, a user terminal transmits the RACH preamble by using a resource that is configured by higher layer signaling. This resource is configured apart from the resources for initial access procedures.

By transmitting a RACH preamble by using a resource that is configured apart from the resources for initial access procedures, the radio base station can recognize the RACH preamble as a beam recovery signal. In this case, the radio base station may transmit a response signal to the beam recovery signal, by using a RAR, instead of the RAR (message 2) for initial access procedures.

Note that the preamble ID or resource of the beam recovery signal may implicitly indicate one or more candidate beams to switch to. In this case, the mobility reference signals (for example, SS blocks and/or CSI-RS resources) of these one or more beams may be associated with the above preamble ID or resource.

(2) When an SRS is used as a beam recovery signal, a user terminal transmits this SRS by using a resource that is configured by higher layer signaling. This resource is configured apart from the resources for initial access procedures. An SRS is thus transmitted by using a resource that is configured apart from sounding resources, so that the radio base station can recognize the SRS as a beam recovery signal.

(3) When an SR is used as a beam recovery signal, a user terminal transmits this SR by using a resource that is configured by higher layer signaling. This resource is configured apart from the resource for a scheduling request. An SR is thus transmitted by using a resource that is configured apart from the resource for a scheduling request, the radio base station can recognize the RACH preamble as a beam recovery signal.

(4) When a beam recovery signal is transmitted by using a PUSCH that is scheduled by a UL grant, the beam recovery signal may be included in uplink control information (UCI), or may be included in a MAC control element (MAC CE). New resources may be configured for UCI that serves as a beam recovery signal.

(5) When a beam recovery signal is transmitted by using a PUCCH, the beam recovery signal is transmitted by using a newly-configured PUCCH field. By transmitting a PUCCH using a resource in a newly-configured PUCCH field, the radio base station can identify this PUCCH as a beam recovery signal.

As for the format of the PUCCH, for example, PUCCH format 1a, 1b or 3 may be re-used. The index of the resource in the newly-configured PUCCH field may be designated for the beam recovery signal, by user terminal-specific higher layer signaling.

Note that existing UCI (for example, delivery acknowledgment information for the PDSCH (also referred to as "HARQ-ACK," "ACK/NACK," "A/N," etc. and/or CSI) may be transmitted by using the PUCCH, simultaneously with the beam recovery signal. In this case, the beam recovery signal may be transmitted using a resource in the new PUCCH field, and the existing UCI may be transmitted in the existing PUCCH field. Alternatively, when the existing UCI is transmitted using a resource in a new PUCCH field, an implicit indication to the effect that the existing UCI is a beam recovery signal may be provided.

Fourth Example

A fourth example of the present invention will describe below the beam recovery process and transmission of response signals in the radio base station in response to beam recovery signals from a user terminal.

Figure 14:
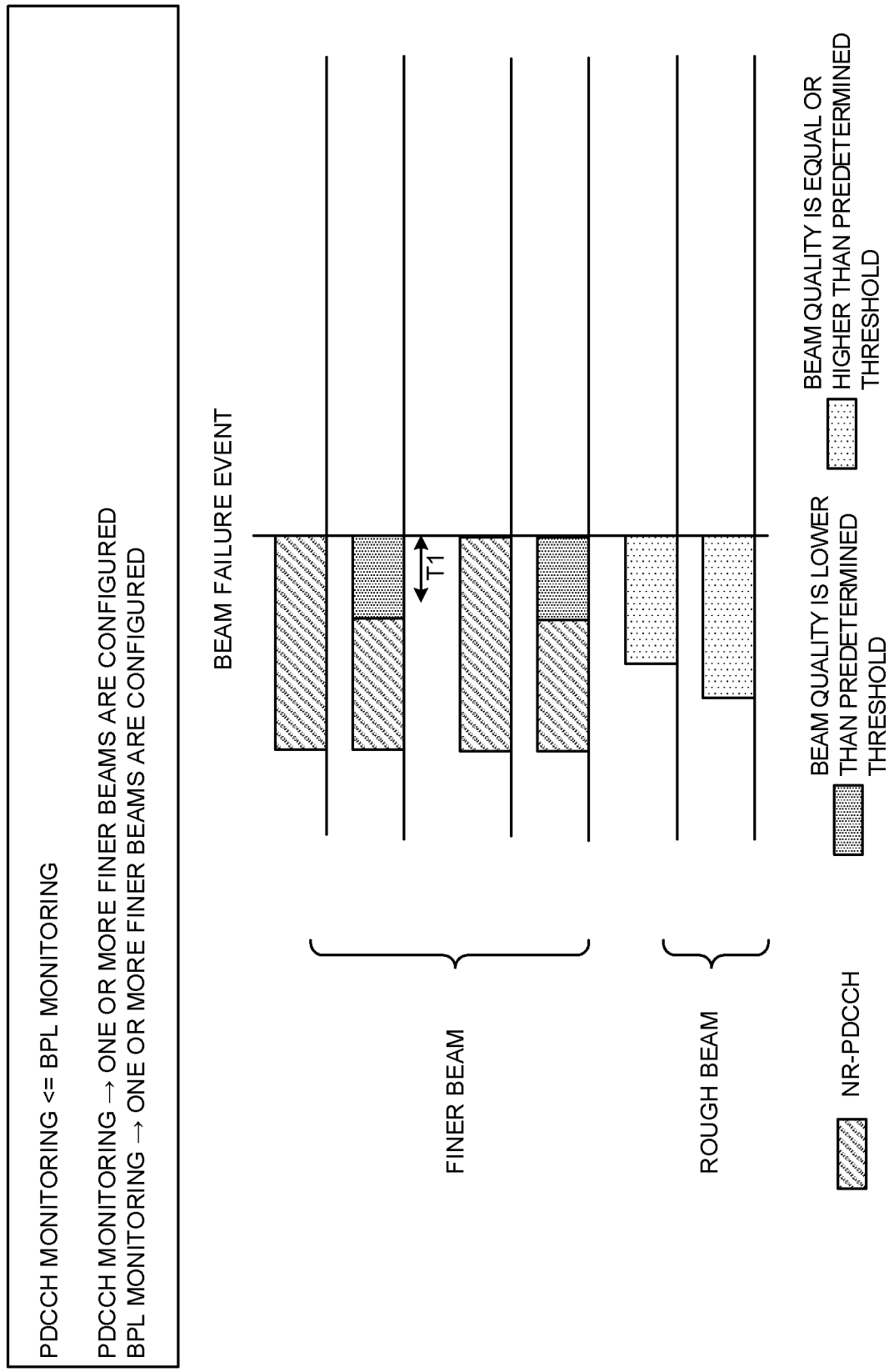
FIG. 14 is a diagram to show an example of the beam recovery process according to a fourth example of the present invention.

FIG. 14 is a diagram to show an example of the beam recovery process according to the fourth example of the present invention. FIG. 14 assumes that the user terminal generates a beam failure event because the period T1 has passed after the quality of a predetermined number of finer beams (for example, Tx beams B21 to B24 in FIG. 1B) (also referred to as "BPLs") fell below a predetermined threshold, but the conditions for triggering a beam failure event are by no means limited to this.

Also, the user terminal measures the quality (for example, the L1-RSRP or L3-RSRP) of rough beams. Mobility measurement signals (for example, CSI-RSs and/or SS blocks) may be used to measure these rough beams.

For example, referring to FIG. 14, when a beam failure event occurs, the user terminal may include information to represent the beam IDs of rough beams of equal or better quality than a predetermined threshold in a beam recovery signal, and transmit this.

The radio base station may re-configure the above one or more finer beams based on rough beams reported from the user terminal. For example, in FIG. 1B, when a rough beam B2 is reported from the user terminal, the radio base station may re-configure finer beams B21 to B24. In this case, the radio base station may transmit information about the re-configuration of one or more finer beams (for example, the association between each finer beam and CSI-RS resources, etc.) in a response signal.

Alternatively, based on the report of rough beams from the user terminal, the radio base station may fall back to PDCCH transmission using rough beams. In this case, the radio base station may configure, in the user terminal, information that is needed to receive the PDCCH by using rough beams (for example, the time and/or frequency resources for the PDCCH, the configuration of the CSI-RS (CSI-RS resource) for CSI measurement/reporting, etc.).

Figure 15:
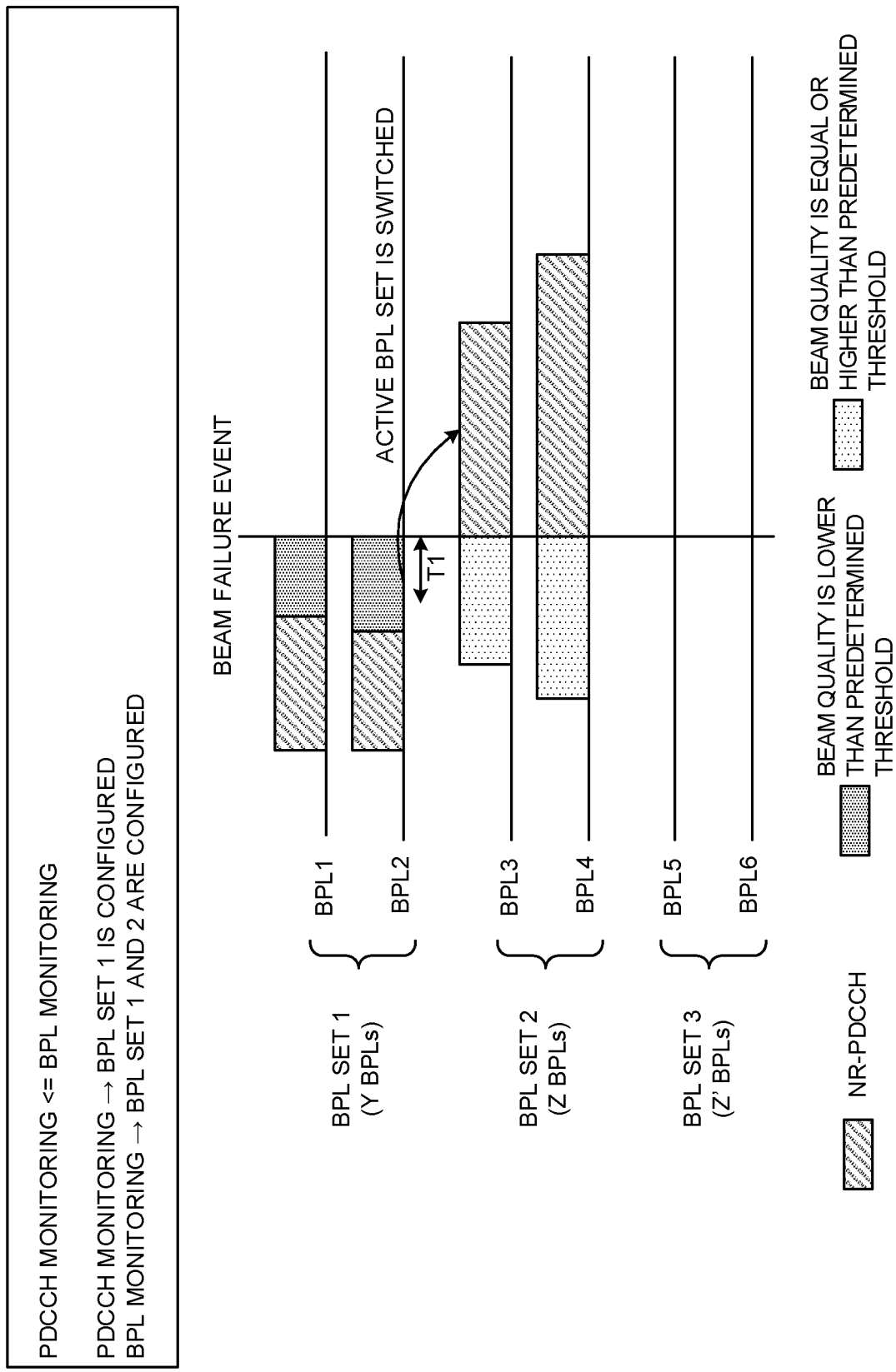
FIG. 15 is a diagram to show another example of the beam recovery process according to the fourth example.

FIG. 15 is a diagram to show another example of the beam recovery process according to the fourth example. FIG. 15 assumes that the user terminal generates a beam failure event because the period T1 has passed after the quality of a predetermined number of beams in the BPL set for monitoring the PDCCH fell below a predetermined threshold, but the conditions for triggering a beam failure event are by no means limited to this.

FIG. 15 assumes that the user terminal generates a beam failure event the user terminal may include information to represent the beam IDs of rough beams of equal or better quality than a predetermined threshold in a beam recovery signal, and transmit this.

The radio base station may transmit a command to switch the active BPL set from BPL set 1 to BPL set 2 in a response signal by using the beam ID in the beam recovery signal from the user terminal, a MAC CE or DCI. In addition, the response signal may contain information that triggers CSI measurement/reporting of each beam in BPL set 2.

Alternatively, if the beam recovery signal from the user terminal only indicates that a beam failure has occurred, the radio base station may decide switching to BPL set 2 based on L1-RSRP measurement/reporting and/or CSI measurement/reporting, and transmit a command for switching to BPL set 2 in a response signal.

Other Examples

The number of BPL sets to configure in a user terminal in the herein-contained examples may be limited to 2. Assuming that only 2 BPL sets are configured in a user terminal, when the radio base station receives a beam recovery signal from the user terminal, the radio base station can transmit a response signal including a command to switch to another BPL set, by using DCI or a MAC control element.

(Radio Communication System)

Now, the structure of a radio communication system according to the present embodiment will be described below. In this radio communication system, communication is performed using one or a combination of the radio communication methods according to the herein-contained embodiments of the present invention.

Figure 16:
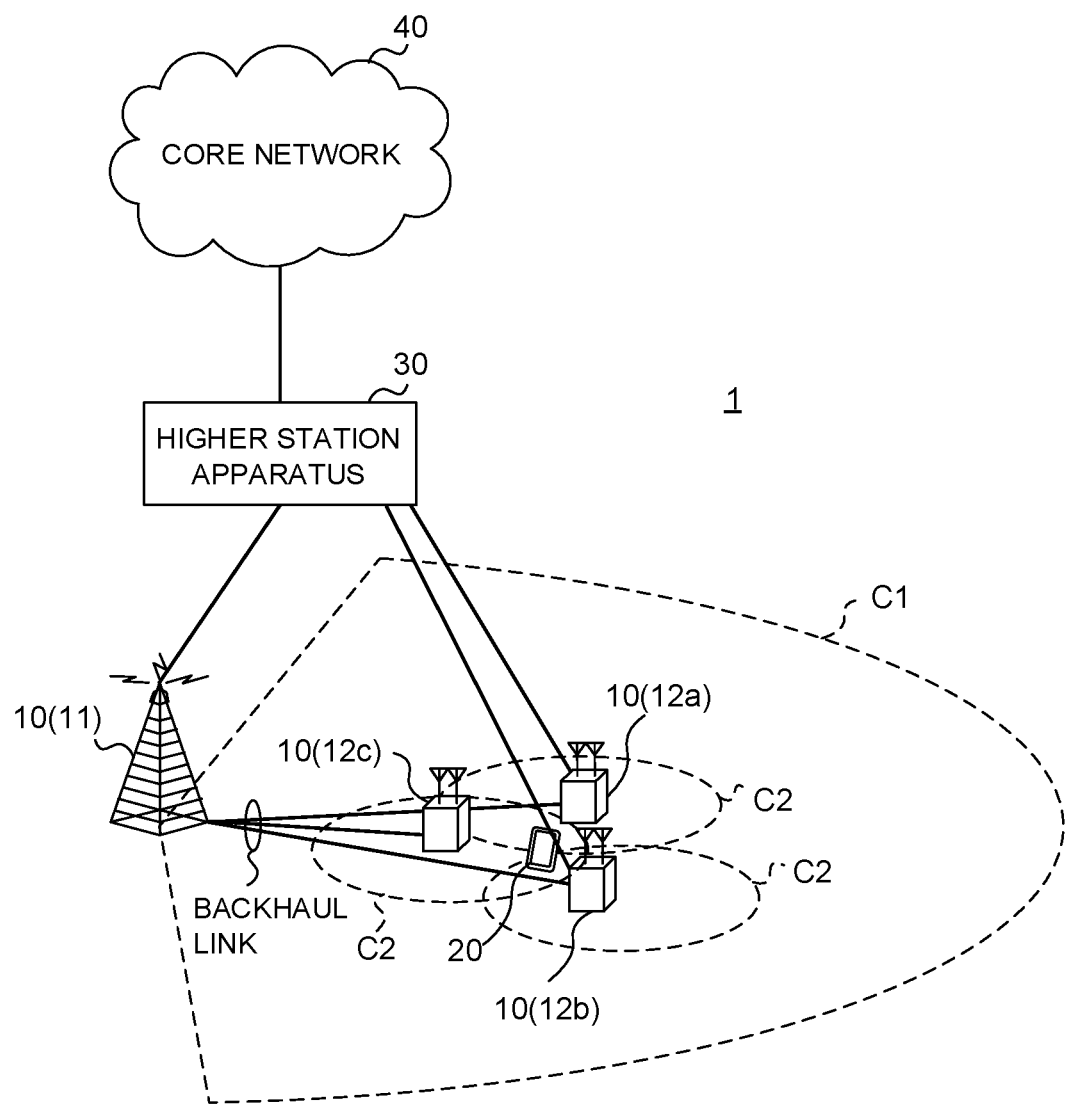
FIG. 16 is a diagram to show an exemplary schematic structure of a radio communication system according to the present embodiment.

FIG. 16 is a diagram to show an exemplary schematic structure of a radio communication system according to an embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes 1 unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)" and so on, or may be seen as a system to implement these.

The radio communication system 1 includes a radio base station 11 that forms a macro cell C1, with a relatively wide coverage, and radio base stations 12a to 12c that are placed within the macro cell C1 and that form small cells C2, which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication is carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3 to 40 GHz) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between 2 radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to these combinations, and other radio access schemes may be used.

In the radio communication system 1, a DL data channel (PDSCH (Physical Downlink Shared CHannel)), which is used by each user terminal 20 on a shared basis, a broadcast channel (PBCH (Physical Broadcast CHannel)), downlink L1/L2 control channels and so on are used as DL (DownLink) channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," and/or the like) in response to the PUSCH is transmitted by the PHICH. The EPDCCH is frequency-division-multiplexed with the PDSCH and used to communicate DCI and so on, like the PDCCH. The PDCCH and/or the EPDCCH are also referred to as "DL control channel," "NR-PDCCH," and the like.

In the radio communication system 1, an UL data channel (PUSCH (Physical Uplink Shared CHannel)), which is used by each user terminal 20 on a shared basis, an UL control channel (PUCCH (Physical Uplink Control CHannel)), a random access channel (PRACH (Physical Random Access CHannel)) and so on are used as UL (UpLink) channels. User data and higher layer control information are communicated by the PUSCH. Also, downlink radio quality information (CQI (Channel Quality Indicator)), delivery acknowledgement information and so on are communicated by the PUCCH. By means of the PRACH, random access preambles for establishing connections with cells are communicated.

In the radio communication systems 1, the cell-specific reference signal (CRS), the channel state information reference signal (CSI-RS), the demodulation reference signal (DMRS), the positioning reference signal (PRS), the mobility reference signal (MRS) and so on are communicated as downlink reference signals. Also, in the radio communication system 1, the measurement reference signal (SRS (Sounding Reference Signal)), the demodulation reference signal (DMRS) and so on are communicated as UL reference signals. Note that the DMRS may be referred to as a "user terminal-specific reference signal (UE-specific Reference Signal)." Also, the reference signals to be communicated are by no means limited to these. In the radio communication system 1, synchronization signals (PSS and/or SSS), a broadcast channel (PBCH) and others are communicated in the downlink.

(Radio Base Station)

Figure 17:
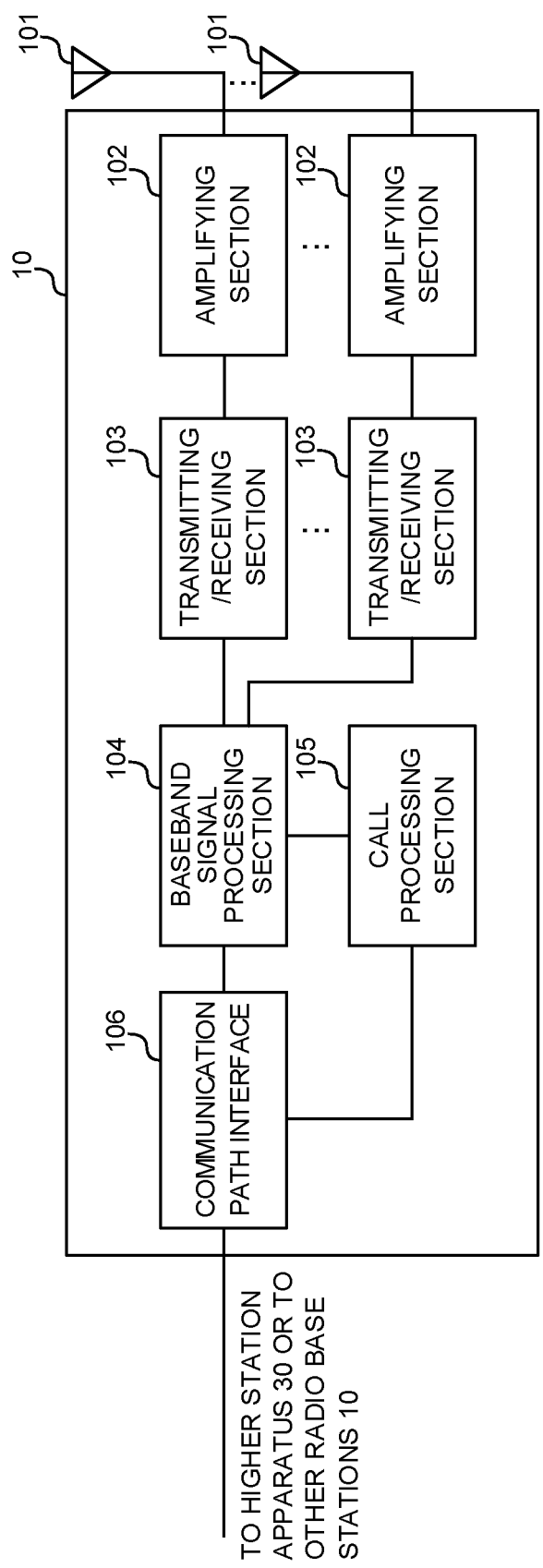
FIG. 17 is a diagram to show an exemplary overall structure of a radio base station according to the present embodiment.

FIG. 17 is a diagram to show an exemplary overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, DL control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, user data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 may furthermore have an analog beamforming section that forms analog beams. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which the present invention pertains. Furthermore, the transmitting/receiving antennas 101 may be constituted by, for example, array antennas. In addition, the transmitting/receiving sections 103 are designed so that single-BF or multiple-BF operations can be used.

The transmitting/receiving sections 103 transmit DL signals (for example, at least one of NR-PDCCH/PDSCH, mobility measurement signals, CSI-RSs, DMRSs, DCI, and DL data) and receive UL signals (for example, at least one of PUCCH, PUSCH, beam recovery signals, measurement reports, beam reports, CSI reports, L1-RSRP reports, UCI and UL data).

Also, the transmitting/receiving sections 103 transmit configuration information related to beam measurements (for example, the relationship among BPL sets for BPL monitoring, PDCCH monitoring, PDSCH receipt, CSI measurement/reporting, L1-RSRP measurement/reporting, etc.). In addition, the transmitting/receiving sections 103 transmit at least one of information to show the configuration of mobility measurement signals, information to show the configuration of CSI-RS resources, information to show the association between DMRS ports and CSI-RSs, and information to show the association with mobility measurement signals (for example, the resources or antenna ports of mobility measurement signals) and UL resources for recovery signals, and so on.

Also, the transmitting/receiving sections 103 may receive a PRACH preamble as a beam recovery signal and transmit a RAR as a response signal to the beam recovery signal. Also, the transmitting/receiving sections 103 may receive an SR, an SRS, a PUSCH or a PUCCH scheduled by a UL grant, as a beam recovery signal.

Figure 18:
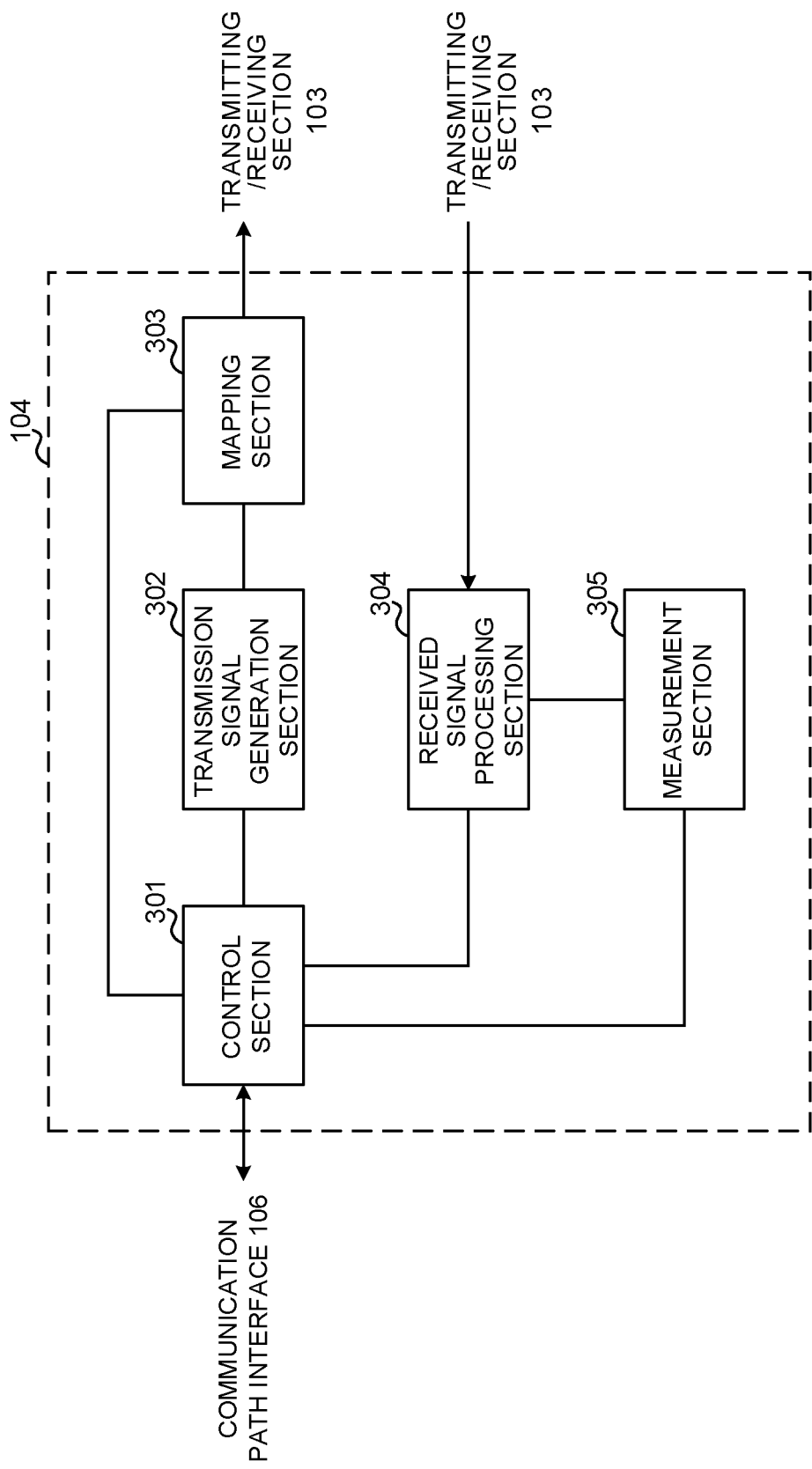
FIG. 18 is a diagram to show an exemplary functional structure of a radio base station according to the present embodiment.

FIG. 18 is a diagram to show an exemplary functional structure of a radio base station according to the present embodiment. Note that, although this example primarily shows functional blocks that pertain to characteristic parts of the present embodiment, the radio base station 10 has other functional blocks that are necessary for radio communication as well.

The baseband signal processing section 104 at least has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls scheduling of DL data channels and UL data channels, and controls generation and transmission of DCI that schedules DL data channels (DL assignments) and DCI that schedules UL data channels (UL grants).

The control section 301 may exert control so that Tx beams and/or Rx beams are formed using digital BF (for example, precoding) by the baseband signal processing section 104 and/or analog BF (for example, phase rotation) by the transmitting/receiving sections 103.

The control section 301 controls the beams (Tx beams and/or Rx beams) that are used to transmit and/or receive DL signals (for example, the NR-PDCCH/PDSCH). To be more specific, the control section 301 may control these beams based on CSI (at least one of the CRI, the CQI, the PMI and the RI) from the user terminals 20.

The control section 301 may control the beams to use to transmit and/or receive mobility measurement signals (for example, CSI-RSs and/or SS blocks). The control section 301 may control the beams to use to transmit and/or receive mobility measurement signals (for example, CSI-RSs and/or SS blocks).

Furthermore, the control section 301 may control beam recovery (switching) based on beam recovery signals from the user terminals 20. To be more specific, the control section 301 may identify each user terminal 20's best beam based on beam recovery signals, and control the re-configuration of CSI-RS resources, re-configuration of DMRS ports and CSI-RS resources, and so on.

Furthermore, the control section 301 may exert control so that information to represent the configuration of re-configured CSI-RS resources, and/or information to represent the QCL between DMRS ports and CSI-RS resources are included in response signals to recovery signals and transmitted.

In addition, the control section 301 may control the association with UL resources for mobility measurement signals (or beam measurement signals) and recovery signals, and control the transmission of information showing the association.

The control section 301 may also configure at least part of one or more beams that are configured for BPL monitoring (beam failure monitoring), for use for PDCCH monitoring (DL control channel monitoring) (see cases 1 to 6 of the first example). Also, the control section 301 may also configure at least part of one or more beams configured for CSI measurement/reporting for use for PDSCH receipt (DL data channel receipt) (see cases 1 to 6 of the first example).

Furthermore, the control section 301 may configure one or more beams configured for CSI measurement/reporting to be at least part of one or more beams configured for reference signal received power (RSRP) measurement and/or reporting (see cases 1 to 6 of the first example).

Also, the control section 301 may configure one or more beams for PDCCH monitoring for PDSCH receipt (see cases 1 and 4 of the first example). Furthermore, the control section 301 may configure one or more beams for PDCCH monitoring for use for PDSCH receipt (see cases 2 and 5 of the first example). The control section 301 may configure part of one or more beams for PDCCH monitoring for PDSCH receipt (see cases 3 and 6 of the first example).

The transmission signal generation section 302 generates DL signals based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

The transmission signal generation section 302 generates DCI (DL assignments, UL grants, etc.) based on commands from the control section 301, for example. Furthermore, a DL data channel (PDSCH) is subjected to an encoding process, a modulation process, a beamforming process (precoding process), based on coding rates, modulation schemes and others, which are determined based on, for example, CSI from each user terminal 20.

The mapping section 303 maps the DL signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals are, for example, UL signals transmitted from the user terminals 20. For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when feedback information (for example, CSI, HARQ-ACK, etc.) arrives from the user terminal, this feedback information is output to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

The measurement section 305 may measure, for example, the received power (for example, RSRP and/or RSSI), the received quality (for example, at least one of RSRQ, the signal-to-interference plus noise ratio (SINR) and the signal-to-noise ratio (SNR), channel states and so forth of received signals. The measurement results may be output to the control section 301.

(User Terminal)

Figure 19:
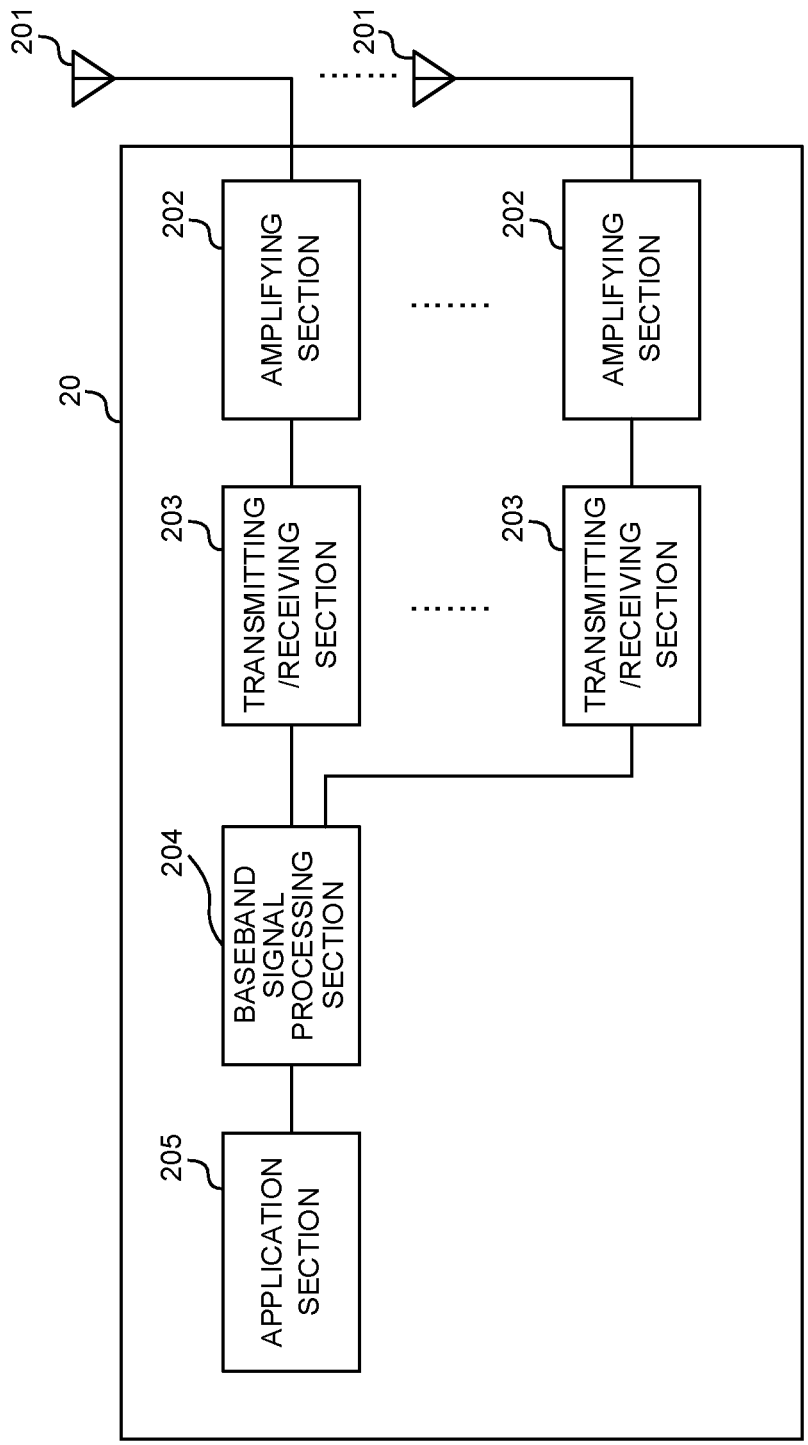
FIG. 19 is a diagram to show an exemplary overall structure of a user terminal according to the present embodiment.

FIG. 19 is a diagram to show an exemplary overall structure of a user terminal according to the present embodiment. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the DL signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process and so on. Downlink user data is forwarded to the application section 205. The application section 205 performs processes related to higher layers above the physical layer and the MAC layer and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 may furthermore have an analog beamforming section that forms analog beams. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which the present invention pertains. Furthermore, the transmitting/receiving antennas 201 may be constituted by, for example, array antennas. In addition, the transmitting/receiving sections 203 are structured so as to be capable of single-BF and multiple-BF operations.

The transmitting/receiving sections 203 receive a DL signal (for example, at least one of an NR-PDCCH/PDSCH, a mobility measurement signal, a beam measurement signal, a CSI-RS, a DMRS, DCI, DL data and an SS block) and transmit a UL signal (for example, at least one of a PUCCH, a PUSCH, a recovery signal, a measurement report, a beam report, a CSI report, UCI and UL data).

Also, the transmitting/receiving sections 203 receive configuration information related to beam measurements (for example, the relationship among BPL sets for BPL monitoring, PDCCH monitoring, PDSCH receipt, CSI measurement/reporting, L1-RSRP measurement/reporting, etc.). In addition, the transmitting/receiving sections 203 transmit at least one of information to show the configuration of mobility measurement signals, information to show the configuration of CSI-RS resources, information to show the association between DMRS ports and CSI-RSs, and information to show the association with mobility measurement signals (for example, the resources or antenna ports of mobility measurement signals) and UL resources for recovery signals, and so on.

Also, the transmitting/receiving sections 203 may transmit a PRACH preamble as a beam recovery signal, and receive a RAR as a response signal to the beam recovery signal. Also, the transmitting/receiving sections 203 may transmit an SR, an SRS, a PUSCH or a PUCCH scheduled by a UL grant, as a beam recovery signal.

Figure 20:
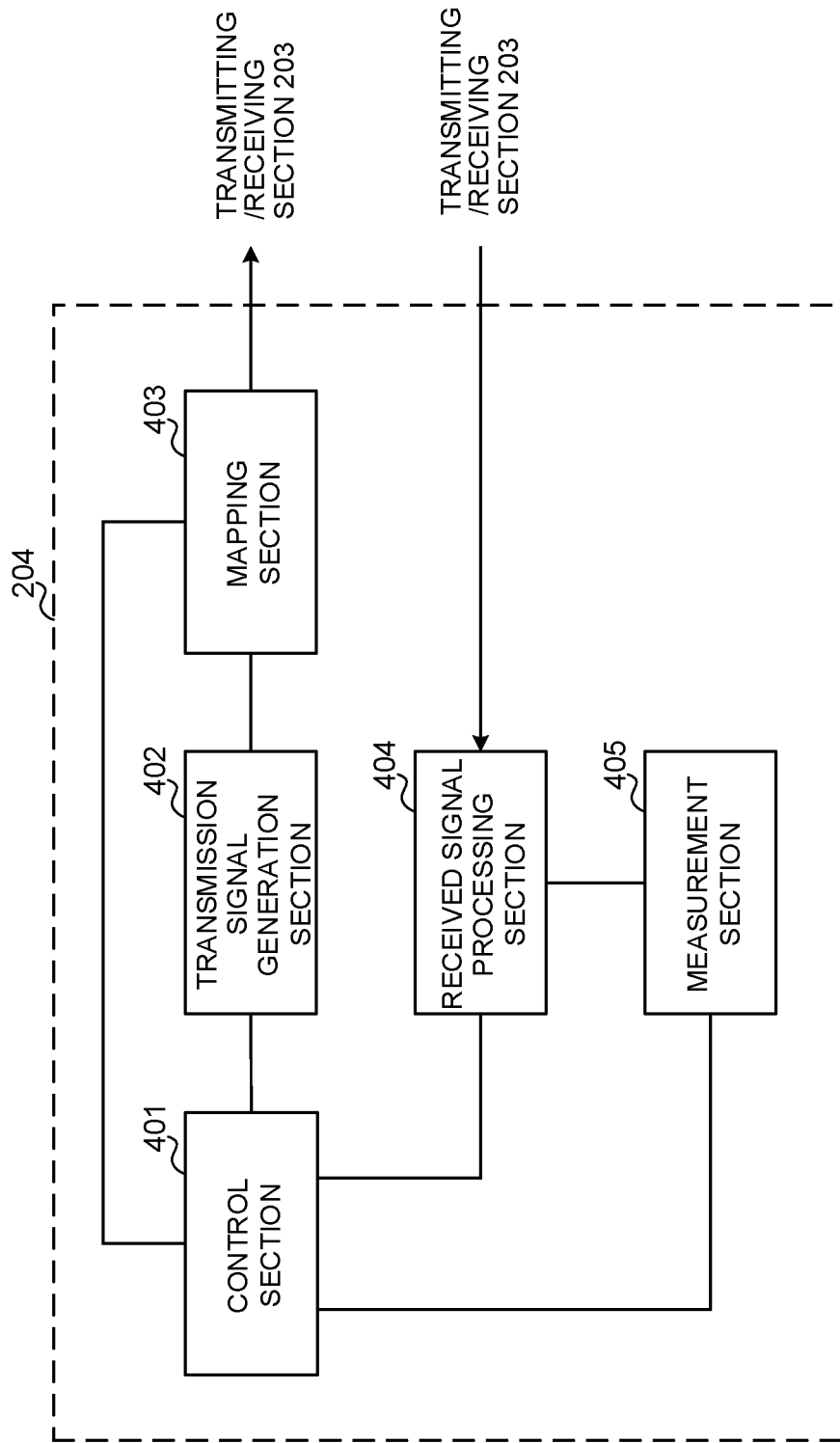
FIG. 20 is a diagram to show an exemplary functional structure of a user terminal according to the present embodiment.

FIG. 20 is a diagram to show an exemplary functional structure of a user terminal according to the present embodiment. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires DL control signals (DL control channels) and DL data signals (DL data channels) transmitted from the radio base station 10 from the received signal processing section 404. The control section 401 controls generation of UL control signals (for example, delivery acknowledgement information and so on) and/or UL data signals based on whether or not retransmission control is necessary, which is decided in response to DL control signals, DL data signals and so on.

The control section 401 may exert control so that transmitting beams and/or receiving beams are formed using the digital BF (for example, precoding) by the baseband signal processing section 204 and/or the analog BF (for example, phase rotation) by the transmitting/receiving sections 203.

The control section 401 controls the beams (Tx beams and/or Rx beams) that are used to transmit and/or receive DL signals (for example, the NR-PDCCH/PDSCH).

Also, the control section 401 configures one or more beams (beam sets, BPL sets, etc.) to use in at least one of BPL monitoring, PDCCH monitoring, PDSCH receipt, CSI measurement/reporting, and L1-RSRP measurement/reporting.

To be more specific, the control section 401 may configure at least part of one or more beams that are configured for BPL monitoring (beam failure monitoring) for use for PDCCH monitoring (DL control channel monitoring) (see cases 1 to 6 of the first example). Also, the control section 401 may also configure at least part of one or more beams configured for CSI measurement/reporting for use for PDSCH receipt (DL data channel receipt) (see cases 1 to 6 of the first example).

Also, the control section 401 may also configure one or more beams configured for CSI measurement/reporting to be at least part of one or more beams configured for reference signal received power (RSRP) measurement and/or reporting (see cases 1 to 6 of the first example).

Furthermore, the control section 401 may configure one or more beams for PDCCH monitoring for use for PDSCH receipt (see cases 1 and 4 in the first example). Also, the control section 401 may configure one or more beams for PDCCH monitoring for PDSCH receipt (see cases 2 and 5 of the first example). The control section 401 may configure part of one or more beams for PDCCH monitoring for PDSCH receipt (see cases 3 and 6 of the first example).

Also, the control section 401 may control the transmission of beam recovery signals based on results of BPL monitoring (see the second example and the third example). The trigger conditions for transmitting beam recovery signals are as described in the second example.

In addition, the control section 401 controls transmission of measurement reports based on RRM measurement results, which have been measured using mobility measurement signals. A measurement report here may include at least one of the beam ID and the RSRP/RSRQ of a beam whose RSRP/RSRQ fulfills a predetermined condition.

Also, based on information indicating the configurations of CSI-RS resources from the radio base station 10, the control section 401 may control the CSI-RS resource measurements by the measurement section 405. Furthermore the control section 401 may control generation and/or reporting of CSI based on beam measurement results (CSI measurement results), which have been measured using CSI-RS resources. At least one of CRI, CQI, PMI and RI may be included in CSI.

Furthermore, the control section 401 may control the receiving process (demodulation and/or decoding) of DL signals based on information to show the QCL between DMRS ports and CSI-RS resources, provided from the radio base station 10. To be more specific, the control section 401 may assume that the same beams as the CSI-RS resources associated with the DMRS ports are used to transmit and/or receive DL signals.

Furthermore, the control section 401 may control the receiving processes (demodulation and/or decoding) for response signals to beam recovery signals. To be more specific, the control section 401 may assume that the beam to use to transmit and/or receive a response signal (and/or the NR-PDCCH or the search spaces to schedule this response signal) is used to transmit and/or receive the mobility measurement reference signal with the best RSRP/RSRQ.

The transmission signal generation section 402 generates UL signals (UL control signals, UL data signals, UL reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

The transmission signal generation section 402 generates feedback information (for example, at least one of an HARQ-ACK, CSI and a scheduling request) based on, for example, command from the control section 401. Also, the transmission signal generation section 402 generates uplink data signals based on commands from the control section 401. For example, when a UL grant is included in a DL control signal that is reported from the radio base station 10, the control section 401 commands the transmission signal generation section 402 to generate an uplink data signal.

The mapping section 403 maps the UL signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, DL signals (DL control signals, DL data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals, the signals after the receiving processes and so on, to the measurement section 405.

The measurement section 405 conducts measurements with respect to the received signals. For example, the measurement section 405 performs measurements using mobility measurement signals and/or CSI-RS resources transmitted from the radio base station 10. The measurement section 405 can be constituted by a measurer, a measurement circuit or measurement apparatus that can be described based on general understanding of the technical field to which the present invention pertains.

The measurement section 405 may measure, for example, the received power (for example, RSRP), the received quality (for example, RSRQ, reception SINR), the channel states and so on of the received signals. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 21:
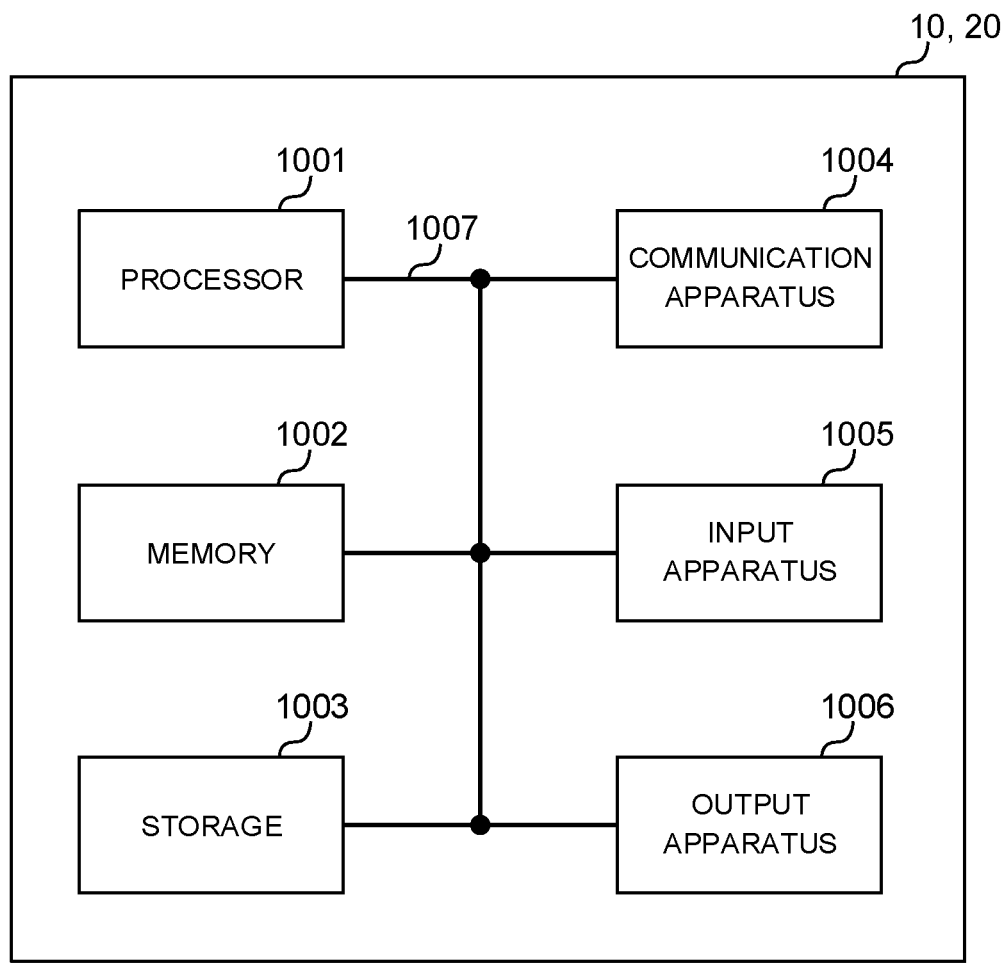
FIG. 21 is a diagram to show an exemplary hardware structure of a radio base station and a user terminal according to the present embodiment.

For example, the radio base station, user terminals and so on according to embodiments of the present invention may function as a computer that executes the processes of the radio communication method of the present invention. FIG. 21 is a diagram to show an exemplary hardware structure of a radio base station and a user terminal according to an embodiment of the present invention.

Physically, the above-described radio base stations 10 and user terminals 20 may be formed as computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only 1 processor 1001 is shown, a plurality of processors may be provided. Furthermore, processes may be implemented with 1 processor, or processes may be implemented in sequence, or in different manners, on one or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each minislot may consist of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, 1 subframe may be referred to as a "transmission time interval" (TTI), or a plurality of consecutive subframes may be referred to as a "TTI," or 1 slot or minislot may be referred to as a "TTI." That is, a subframe and/or a TTI may be a subframe (1 ms) in existing LTE, may be a shorter period than 1 ms (for example, 1 to 13 symbols), or may be a longer period of time than 1 ms. Note that the unit to represent the TTI may be referred to as a "slot," a "minislot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that when a TTI is given, the time interval (for example, the number of symbols) in which transport blocks, code blocks and/or codewords are actually mapped may be shorter than the TTI.

Note that, when 1 slot or 1 minislot is referred to as a "TTI," one or more TTIs (that is, one or more slots or one or more minislots) may be the minimum time unit of scheduling. Also, the number of slots (the number of minislots) to constitute this minimum time unit of scheduling may be controlled.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," "a partial TTI (or a "fractional TTI")," a "shortened subframe," a "short subframe," a "mini slot," "a sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be 1 slot, 1 minislot, 1 subframe or 1 TTI in length. 1 TTI and 1 subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair" and so on.

Furthermore, a resource block may be comprised of one or more resource elements (REs). For example, 1 RE may be a radio resource field of 1 subcarrier and 1 symbol.

Note that the structures of radio frames, subframes, slots, minislots, symbols and so on described above are merely examples. For example, configurations pertaining to the number of subframes included in a radio frame, the number of slots included in a subframe or a radio frame, the number of minislots included in a slot, the number of symbols and RBs included in a slot or a minislot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols, chips and so on, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by 1 bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by higher nodes (upper nodes). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), p Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. In this way, reference to the first and second elements does not imply that only 2 elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between 2 elements that are "connected" or "coupled" to each other. The coupling or connection between the elements may be physical, logical or a combination thereof. For example, "connection" may be interpreted as "access." As used herein, 2 elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency regions, microwave regions and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
   a receiver that receives configuration information for monitoring a downlink (DL) control channel; and
   a processor that detects a beam failure based on quality of a signal included in a set of detection signal resources determined based on the configuration information,
   wherein when the beam failure is detected, the processor controls to transmit a Medium Access Control Control Element (MAC CE) indicating a beam failure detection, and
   wherein the MAC CE indicates a CSI-RS resource ID to show a CSI-RS resource associated with a candidate beam.

2. The terminal according to claim 1, wherein when the beam failure is detected, the processor controls to transmit the MAC CE using a Physical Uplink Shared Channel (PUSCH) that is scheduled by downlink control information in response to a scheduling request.

3. The terminal according to claim 1, wherein quality of the candidate beam is equal to or better than a threshold.

4. A radio communication method for a terminal, comprising:
   receiving configuration information for monitoring a downlink (DL) control channel; and
   detecting a beam failure based on quality of a signal included in a set of detection signal resources determined based on the configuration information; and
   controlling, when the beam failure is detected, to transmit a Medium Access Control Control Element (MAC CE) indicating a beam failure detection, and
   wherein the MAC CE indicates a CSI-RS resource ID to show a CSI-RS resource associated with a candidate beam.

5. A base station comprising:
   a transmitter that transmits configuration information for monitoring a downlink (DL) control channel to a terminal; and
   a receiver that receives from the terminal a Medium Access Control Control Element (MAC CE) indicating a beam failure detection, wherein a beam failure is detected by the terminal based on quality of a signal included in a set of detection signal resources determined based on the configuration information, and
   wherein the MAC CE indicates a CSI-RS resource ID to show a CSI-RS resource associated with a candidate beam.

6. A system comprising:
   a terminal that comprises:
      a receiver of the terminal that receives configuration information for monitoring a downlink (DL) control channel; and
      a processor that detects a beam failure based on quality of a signal included in a set of detection signal resources determined based on the configuration information,
   wherein when the beam failure is detected, the processor controls to transmit a Medium Access Control Control Element (MAC CE) indicating a beam failure detection, and
   wherein the MAC CE indicates a CSI-RS resource ID to show a CSI-RS resource associated with a candidate beam; and
   a base station that comprises:
      a transmitter that transmits the configuration information to the terminal; and
      a receiver of the base station that receives from the terminal the MAC CE.

* * * * *